United States Patent
Barbone et al.

(10) Patent No.: US 10,643,592 B1
(45) Date of Patent: May 5, 2020

(54) VIRTUAL / AUGMENTED REALITY DISPLAY AND CONTROL OF DIGITAL AUDIO WORKSTATION PARAMETERS

(71) Applicant: Perspective VR, Los Angeles, CA (US)

(72) Inventors: Gregory Stephen Barbone, Los Angeles, CA (US); Ryan Gilligan, Los Angeles, CA (US)

(73) Assignee: Perspective VR, Los Angeles, CA (US)

( * ) Notice: Subject to any disclaimer, the term of this patent is extended or adjusted under 35 U.S.C. 154(b) by 0 days.

(21) Appl. No.: 16/667,594

(22) Filed: Oct. 29, 2019

Related U.S. Application Data

(60) Provisional application No. 62/752,790, filed on Oct. 30, 2018.

(51) Int. Cl.
| | | |
|---|---|---|
| G10H 1/00 | (2006.01) | |
| G06F 3/01 | (2006.01) | |
| H04L 29/06 | (2006.01) | |
| G10H 1/46 | (2006.01) | |
| G06F 3/0484 | (2013.01) | |

(52) U.S. Cl.
CPC ........... G10H 1/0008 (2013.01); G06F 3/011 (2013.01); G06F 3/017 (2013.01); G06F 3/04847 (2013.01); G10H 1/0066 (2013.01); G10H 1/46 (2013.01); H04L 67/38 (2013.01); G10H 2220/401 (2013.01)

(58) Field of Classification Search
CPC ...... G10H 1/0008; G10H 1/0066; G10H 1/46; G10H 2220/401; G06F 3/04; G06F 3/017; G06F 3/04847
USPC .................................................. 84/626, 633
See application file for complete search history.

(56) References Cited

U.S. PATENT DOCUMENTS 5,808,219 A * 9/1998 Usa ..................... G10H 1/00
 84/477 B
7,176,373 B1 * 2/2007 Longo .................. G10H 1/0066
 84/600

(Continued)

FOREIGN PATENT DOCUMENTS

WO 2017173776 10/2017

OTHER PUBLICATIONS

Adam Crute, Virtual Reality: How Will it Change the Way You Make Music? pp. 1-6, May 14, 2019.

(Continued)

*Primary Examiner* — David S Warren
(74) *Attorney, Agent, or Firm* — Van Pelt, Yi & James LLP

(57) ABSTRACT

Motion control data is received from one or more sensors. A first parameter value associated with a music composition is received from a digital audio workstation. A second parameter value associated with the music composition is received from the digital audio workstation. The motion control data is converted to one or more manipulations of one or more virtual objects. The one or more manipulations of the one or more virtual objects are mapped to at least a first command that adjusts the first parameter value and a second command that adjusts the second parameter value. The first command is sent to the digital audio workstation using a first audio input protocol recognized by the digital audio workstation. The second command is sent to the digital audio workstation using a second audio input protocol recognized by the digital audio workstation.

26 Claims, 20 Drawing Sheets

(56) References Cited

U.S. PATENT DOCUMENTS

| | | | | |
|---|---|---|---|---|
| 7,723,604 | B2* | 5/2010 | Bang | G10H 1/0041 84/615 |
| 7,754,955 | B2 | 7/2010 | Egan | |
| 8,653,349 | B1 | 2/2014 | White | |
| 9,061,205 | B2* | 6/2015 | Chrzanowski, Jr. | A63F 13/10 |
| 9,524,141 | B2* | 12/2016 | Loh | G06F 3/165 |
| 9,542,919 | B1 | 1/2017 | Bencar | |
| 9,785,190 | B2* | 10/2017 | Liu | G06F 1/1632 |
| 10,252,163 | B2* | 4/2019 | Chrzanowski, Jr. | A63F 13/10 |
| 2003/0188627 | A1* | 10/2003 | Longo | G10H 1/0066 84/627 |
| 2007/0012167 | A1* | 1/2007 | Bang | G10H 1/0008 84/723 |
| 2007/0186759 | A1* | 8/2007 | Bang | G10H 1/0041 84/723 |
| 2008/0078282 | A1* | 4/2008 | Saijo | G10H 1/0008 84/611 |
| 2009/0145284 | A1* | 6/2009 | Saijo | G10H 1/0008 84/609 |
| 2010/0009749 | A1* | 1/2010 | Chrzanowski, Jr. | A63F 13/10 463/35 |
| 2011/0148884 | A1* | 6/2011 | Zeleny | G10H 1/0008 345/441 |
| 2011/0303075 | A1* | 12/2011 | McMillen | G10H 1/125 84/645 |
| 2014/0181338 | A1* | 6/2014 | Loh | G06F 3/165 710/63 |
| 2017/0115689 | A1* | 4/2017 | Liu | G06F 1/1632 |
| 2018/0181370 | A1* | 6/2018 | Parkinson | G06F 3/0481 |
| 2018/0300031 | A1* | 10/2018 | Parkinson | G06F 3/017 |
| 2019/0069080 | A1* | 2/2019 | Abrams | H04R 1/406 |
| 2019/0192969 | A1* | 6/2019 | Chrzanowski | A63F 13/10 |
| 2019/0373355 | A1* | 12/2019 | Lee | G06F 3/017 |

OTHER PUBLICATIONS

DearVR, dearVR Spatial Connect—Dear Reality, pp. 1-11, Jul. 17, 2019, retrieved from: https://www.dearvr.com/products/dearvr-spatial-connect/.

Electronic Beats, This MIDI Controller Lets You Make Beats in Virtual Reality, pp. 1-8, Aug. 11, 2017, retrieved from: https://www.electronicbeats.net/the-feed/midi-controller-lets-make-beats-virtual-reality/.

Gerard Serra, GESERRA, Inflight Sound VR, VR Mixer, A Virtual Reality Music Sequencer, pp. 1-12, Jun. 12-16, 2017, retrieved from: http://geserra.com/vr-mixer.html.

Reality Decks, Use Virtual Reality to DJ, Mix and Record, pp. 1-6, retrieved on Jul. 17, 2019 from: https://realitydecks.com/.

Steam, Block Rocking Beats, pp. 1-4, Release Date Jun. 30, 2017, Retrieved on Jul. 17, 2019, from: https://store.steampowered.com/app/425400/Block_Rocking_Beats/.

Steam, Tranzient, Release Date Jun. 3, 2019, Retrieved on Jul. 17, 2019 from: https://store.steampowered.com/app/903910/Tranzient/.

Steam, TribXR DJ School, Release Date Mar. 25, 2019, pp. 1-6, Retrieved on Jul. 17, 2019 from: https://store.steampowered.com/app/877850/TribeXR_DJ_School/.

Steam, Vinyl Reality, Release Date Nov. 16, 2017, pp. 1-6, Retrieved on Jul. 17, 2019 from: https://store.steampowered.com/app/642770/Vinyl_Reality/.

Virtual Reality Wiki, Soundstage, pp. 1-4, Release Date 2016, Retrieved on Jul. 17, 2019 from: https://vr.gamepedia.com/SoundStage.

* cited by examiner

VIRTUAL / AUGMENTED REALITY DISPLAY AND CONTROL OF DIGITAL AUDIO WORKSTATION PARAMETERS

CROSS REFERENCE TO OTHER APPLICATIONS

This application claims priority to U.S. Provisional Patent Application No. 62/752,790 entitled VIRTUAL REALITY MIDI AND DAW CONTROLLER FOR MUSIC PRODUCTION AND COMPOSITION filed Oct. 30, 2018 which is incorporated herein by reference for all purposes.

BACKGROUND OF THE INVENTION

Music production involves the recording of sound (e.g., in the form of vocals, instruments, sound effects, and so forth) onto a non-transitory storage medium (e.g., an analog or digital storage medium). Recording music onto analog storage media (e.g., magnetic tape) is no longer a common practice in the music production/recording industry. Currently, most music production is accomplished using sophisticated software that can record, edit, and produce digital audio files. This software, referred to as digital audio workstation (DAW) software, allows for the manipulation of parameters associated with music tracks and comes in a variety of configurations. Typically, display of and interaction with these music parameters occurs via a two-dimensional display (e.g., a flat-panel monitor). However, two-dimensional displays have limitations (e.g., in terms of versatility of display and degree of control of parameters). Therefore, techniques are needed to better display and control music parameters associated with the various types of DAWs currently used for music production.

BRIEF DESCRIPTION OF THE DRAWINGS

Various embodiments of the invention are disclosed in the following detailed description and the accompanying drawings.

DETAILED DESCRIPTION

Figure 1A:
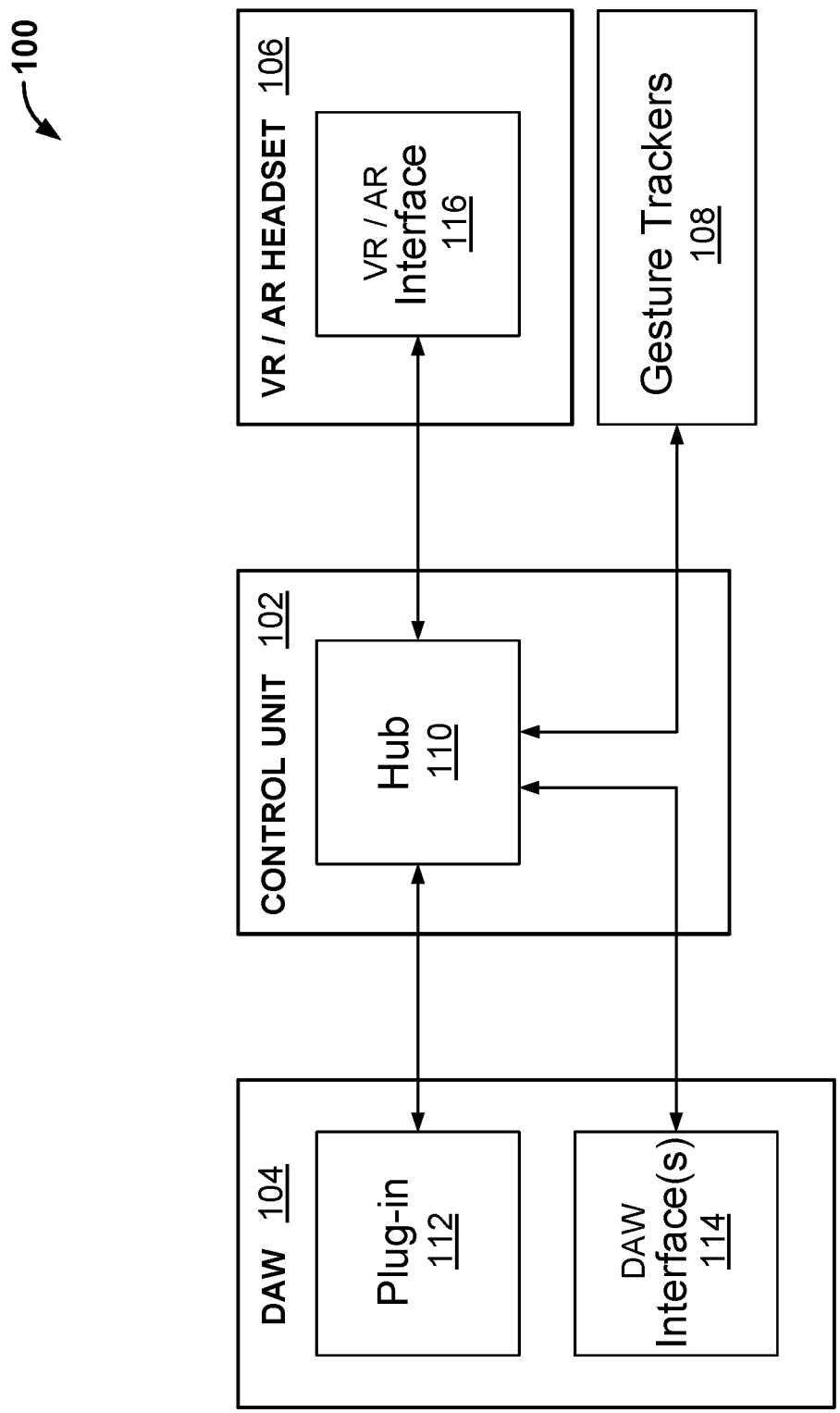
FIG. 1a is a block diagram illustrating an embodiment of a system for displaying and controlling DAW parameters in a virtual/augmented reality environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for virtual/augmented reality display and control of digital audio workstation (DAW) parameters is disclosed. The disclosed system includes an interface configured to receive motion control data from one or more sensors, receive a first parameter value associated with a music composition from a DAW, and receive a second parameter value associated with the music composition from the DAW. The disclosed system further includes a processor configured to convert the motion control data to one or more manipulations of one or more virtual objects, map the one or more manipulations of the one or more virtual objects to at least a first command that adjusts the first parameter value and a second command that adjusts the second parameter value, send the first command to the digital audio workstation using a first audio input protocol recognized by the digital audio workstation, and send the second command to the digital audio workstation using a second audio input protocol recognized by the digital audio workstation. As used herein, unless otherwise indicated by the context, virtual objects (e.g., virtual drums, virtual faders, virtual sliders, virtual buttons, virtual mix spheres, virtual effects cubes, virtual dynamics pyramids, or any other virtual instrument or object) can refer to objects rendered in either a virtual reality or an augmented reality environment. The techniques disclosed herein (e.g., communication techniques) are applicable to both virtual reality and augmented reality systems and environments. Technological benefits of the disclosed system include improved visualization of DAW parameters, finer/more granular control of DAW parameters, and more flexible, intuitive, and efficient interaction with and manipulation of DAW parameters.

In another embodiment, the disclosed system includes an interface configured to receive a parameter value associated with a music composition from a digital audio workstation and motion control data from a sensor. In this embodiment, the disclosed system further includes a processor configured to: display a virtual object (wherein changes to the parameter value map to configuration changes of the virtual object), determine an updated parameter value based at least in part on the motion control data, display an updated virtual object, and send the updated parameter value to the digital audio workstation.

Modern music recording and production relies heavily on DAW software. However, standard DAW display and control interfaces have limitations. As described herein, virtual reality (VR) or augmented reality (AR) display and control of DAW parameters (also referred to herein as parameters, music parameters, audio parameters, etc.) allows for the translation of life-size gestures into expressive control and automation of virtual instruments, mixing, and effects. In various embodiments, using the techniques described herein, a user can adjust multiple parameters simultaneously by interacting with objects in virtual (or augmented) reality environments. In various embodiments, the techniques involve operating over a wireless network. Furthermore, a wide range of DAW parameters across various DAW software are supported.

Developing such techniques is technically challenging for various reasons. One technical problem is achieving low latency within the visualization/interaction environment, which is necessary for an acceptable user experience. Achieving low latency is particularly challenging due to the need to communicate large volumes of music data over a slow medium, such as a wireless network. Furthermore, supporting a wide range of DAW parameters across various DAW software is challenging due to the numerosity and diversity of DAW software and the lack of standardization across DAW software. As described in further detail herein, part of the solution is to construct an interface that supports multiple audio input protocols and at the same time optimize data transfer for low latency communication. In various embodiments, a plug-in is embedded in the DAW that is being used (also referred to herein as the host DAW) to facilitate fast data transfer and support various DAW parameters. Additionally, low latency techniques such as filtering, data format conversion, and use of different communication protocols are used.

In various embodiments, DAW parameters are controlled by moving virtual objects in a virtual/augmented reality space. Object movement can be translated to control data to feed to DAW software. A variety of different control protocols exist for DAWs. These control protocols are also referred to herein as audio input protocols because they are used to communicate audio data (e.g., used to input audio data to a DAW). A benefit of the disclosed techniques is the ability to utilize multiple control protocols. Control protocols that are utilized include Musical Instrument Digital Interface (MIDI), Human User Interface Protocol (HUI), and Open Sound Control (OSC). In various embodiments, a plug-in embedded in the host DAW communicates with other components via OSC, which is a protocol adapted to fast communication (low latency) applications. The example protocols listed above are illustrative and not restrictive. Various other established protocols (e.g., Protocol Buffers, JSON, etc.) may be used. The techniques described herein are applicable to any method for sending messages between the system components described herein.

Multiple control protocols are used in order to solve the problem of supporting a wide range of DAW parameter and functionality across a variety of DAW software. For example, use of MIDI or OSC alone may not allow for effective transport control (e.g., playing, pausing, stopping audio, and so forth). Thus, HUI, which is suited for transport control of DAW parameters, is also used. In addition, HUI is typically used for reverb sends (an example of modifying a signal without affecting the original signal). MIDI is an effective protocol for sending note data (e.g., pitch, intensity, and duration of notes) associated with various instruments. OSC is effective for fast communication. As described in further detail below, OSC is typically more effective than MIDI or HUI for sending certain DAW parameters.

The above are generalizations that may or may not be applicable to every DAW. Stated alternatively, mappings between control protocols and DAW parameters can be different for the various DAWs. Thus, a flexible, integrated control ecosystem is required. For example, in some DAWs, HUI is not used. Instead, an application programming interface (API) allows direct access (e.g., through Python control scripting) to control parameters that would typically be controlled via HUI. Each audio input protocol has limitations. Thus, incorporating multiple audio input protocols (e.g., MIDI, HUI, and OSC) is needed for effective DAW communication across different DAW platforms. In some embodiments, a virtual desktop control protocol is also used to control DAW parameters. A virtual desktop can be used to display a VR space desktop that can be manipulated with a VR laser pointer having the functionality of a computer mouse. A virtual mouse and keyboard can be used to control clickable DAW parameters.

FIG. 1a is a block diagram illustrating an embodiment of a system for displaying and controlling DAW parameters in a virtual/augmented reality environment. Display/control system 100 includes control unit 102, DAW 104, VR/AR headset 106, and gesture trackers 108. Control unit 102 receives DAW parameters from DAW 104. These DAW parameters are transmitted by control unit 102 to VR/AR headset 106 to be displayed to an operator/user of the system. In addition, control unit 102 receives motion control data from gesture trackers 108. In various embodiments, the motion control data is converted to manipulations of virtual objects associated with the DAW parameters and the manipulations are rendered to the operator/user in real time via VR/AR headset 106. In various embodiments, control unit 102 is also responsible for updating DAW parameter values based on actions of the operator/user (e.g., as represented by the motion control data) and sending the updated DAW parameter values back to DAW 104 using various audio input protocols.

In the example illustrated, control unit 102 includes hub 110. In various embodiments, hub 110 is an instance of software that interfaces with other instances of software (e.g., software residing within DAW 104, VR/AR headset 106, gesture trackers 108, etc.). Hub 110 can be implemented in various programming languages (e.g., C #, C++, Python, any combination thereof, etc.). In the example shown, hub 110 communicates with plug-in 112 and DAW interface(s) 114 of DAW 104, VR/AR interface 116 of VR/AR headset 106, and gesture trackers 108. Hub 110 includes software interface components to receive data and processor components to process and send data. In various embodiments, hub 110 creates and stores the representations for the various virtual objects (that are mapped to DAW parameters) described herein. See FIG. 1b for an example user interface for hub 110 to configure virtual object to DAW parameter mappings. The example shown is illustrative and not restrictive. Some components of control unit 102 have been omitted for the purpose of clarity of illustration. For example, in various embodiments, control unit 102 is wirelessly connected to its communication counterparts, meaning control unit 102 would include wireless (e.g., Wi-Fi) hardware and software. In some embodiments, the components of display/control system 100 are connected over a Wi-Fi network (e.g., Wi-Fi-802.11a, Wi-Fi-802.11b, Wi-Fi-802.11g, Wi-Fi-802.11n, etc.). In some embodiments, one or more of the connections in display/control system 100 are through wires. Wired connections typically allow for faster communication of data but may limit operator/user mobility.

Figure 1B:
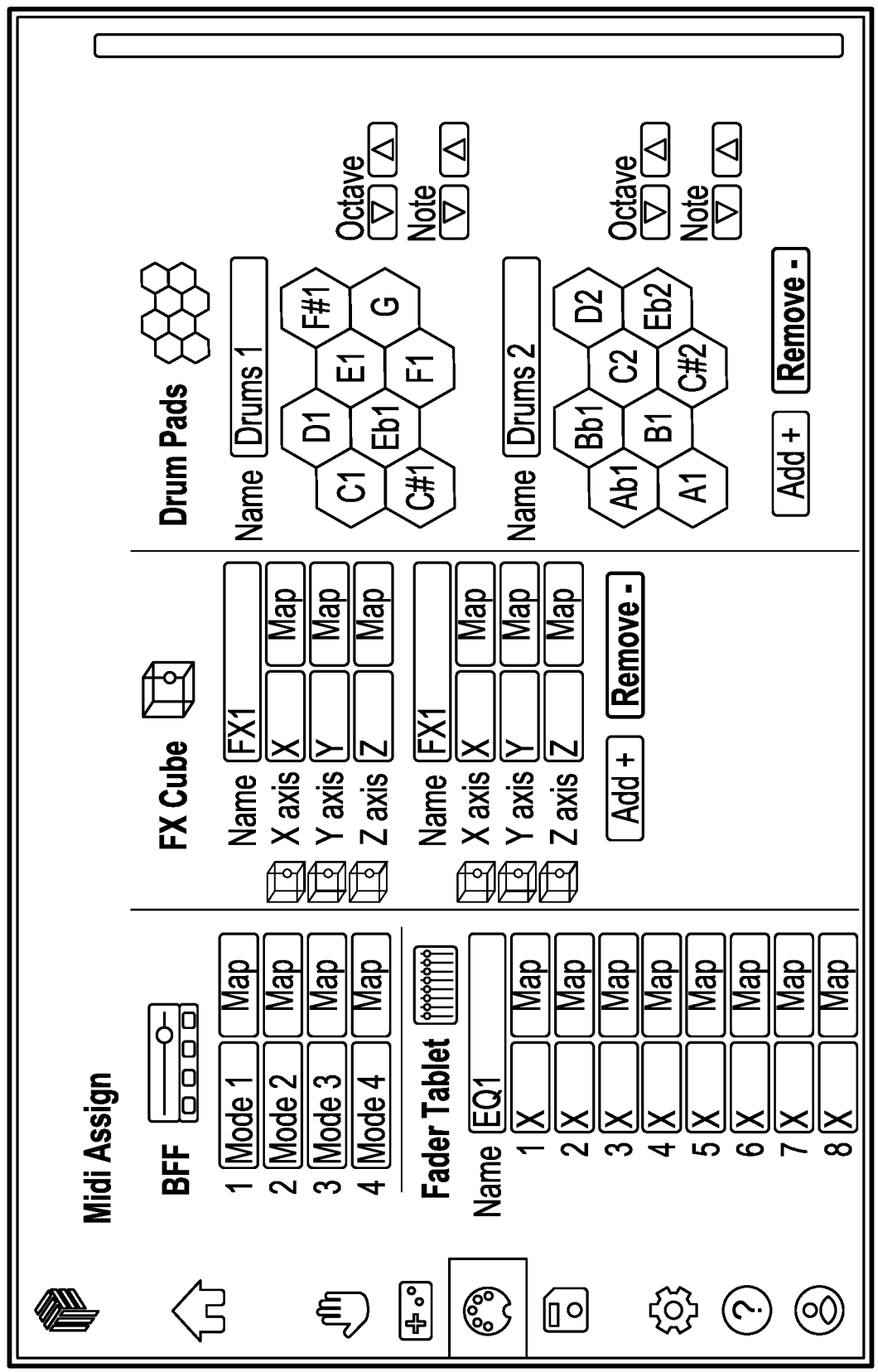
FIG. 1b is a screenshot illustrating an example hub user interface.

The operator/user is able to interact with hub 110 to set relevant configuration settings. Stated alternatively, the operator/user can map actions and properties in VR/AR space to DAW parameters. An example user interface for hub 110 is shown in FIG. 1b. In the example shown in FIG. 1b, the operator/user can click buttons to map DAW parameters to various VR/AR objects. For example, as shown in the middle column, movements along X, Y, and Z axes associated with an FX (effects) cube can be mapped to DAW parameters, allowing for control of three different DAW parameters with the FX cube. VR/AR objects, e.g., the BFF ("Big Freaking Fader," a large-scale mappable fader), FX Cube, Drum Pads, etc., and how they are used to map DAW parameters are described in further detail herein. The VR/AR objects comprise a suite of three-dimensional interactable tools. VR/AR objects are also referred to herein as rendered objects or simply virtual objects or objects. As used herein, any such term (e.g., virtual object) encompasses both VR and AR objects.

Returning to the example of FIG. 1a, DAW 104 includes plug-in 112 and DAW interface(s) 114. In various embodiments, plug-in 112 is an instance of software that natively communicates with hub 110 (e.g., hub 110 and plug-in 112 are implemented together to be complementary to each other). Plug-in 112 can be implemented in various programming languages (e.g., C #, C++, Python, any combination thereof, etc.). In various embodiments, plug-in 112 is not a built-in component of DAW 104; rather, plug-in 112 is embedded within DAW 104 for the purpose of interfacing with hub 110. DAW interface(s) 114 are built-in components of DAW 104. For example, DAW interface(s) 114 can include MIDI and HUI interfaces that can directly communicate data with hub 110. DAW interface(s) 114 can also include one or more APIs. For some DAWs, plug-in 112 is not needed if the DAWs provide APIs that allow for fast and direct communication. Therefore, plug-in 112 is not necessarily installed onto every DAW. The example shown is illustrative and not restrictive. Some components of DAW 104 have been omitted for the purpose of clarity of illustration. For example, in some embodiments, DAW 104 is wirelessly connected to control unit 102 and would include wireless (e.g., Wi-Fi) hardware and software (see above regarding Wi-Fi). In addition, DAW 104 (and/or control unit 102) may be connected to one or more audio speakers for music playback. DAW 104 (and/or control unit 102) may include speaker interface hardware and software. Examples of audio speakers include headphones, surround sound speakers in various configurations, etc. In some embodiments, control unit 102 controls headphones. In some embodiments, DAW 104 sends data to surround sound and/or other speakers.

In the example illustrated, VR/AR headset 106 includes VR/AR interface 116. In various embodiments, VR/AR interface 116 is not a built-in component of VR/AR headset 106; rather, VR/AR interface 116 is installed onto VR/AR headset 106 for the purpose of interfacing with hub 110. In the example shown, for the purpose of clarity of illustration, the rendering hardware and software of VR/AR headset 106 and other VR/AR headset details are not shown explicitly. VR/AR interface 116 sends data received from hub 110 to rendering hardware and software to provide a display for the operator/user. VR/AR headsets are well-known in the art and are not discussed in further detail herein. VR/AR headset 106 can be a VR headset, an AR headset, or a VR/AR combined headset. An AR-capable headset would include a camera that captures images of the real world. With both VR and AR, rendered (not real-world) objects would be generated for the operator/user to interact with and manipulate. In some embodiments, headset-derived positional and velocity tracking information (in addition to manipulation of rendered, non-real-world objects) are also translated to control data (to control DAW parameters). For example, nodding of the head can be used to control a DAW parameter. Head tracking, as is well-known in the art, is also used to determine where the operator/user is looking in the VR/AR environment.

In the example illustrated, gesture trackers 108 are connected to control unit 102. Gesture trackers 108 are sensors that provide motion control data to control unit 102. Examples of gesture trackers include tracked controllers, arm tracking sensors, hand tracking sensors, and finger tracking sensors. Gesture trackers 108 recognize arm/hand/finger gestures, which can be translated into control data by hub 110. For example, clicking a button of a tracked controller or recognizing a finger or hand movement can be translated by hub 110 to a pressing action in a virtual/augmented reality space. In various embodiments, real body movements of an operator/user are mapped to movements of virtual body parts. These virtual movements are rendered and used to interact with various virtual objects. A benefit of the virtual/augmented reality environment is that greater ranges of motion can be associated with actions. For example, an arm moving across space to control a DAW parameter corresponds to a range of motion of approximately several feet, whereas moving a traditional sliding control or knob on a two-dimensional flat panel display or in the real world corresponds to a range of motion of approximately several inches. Greater ranges of motion allow for higher levels of granularity/higher dynamic range of control of DAW parameters. As described in further detail herein, another benefit of a virtual/augmented reality environment is haptic feedback. Recognized gestures can also be assigned to keyboard combinations and/or shortcuts. Gesture trackers (e.g., for use with VR/AR headsets) are well-known in the art and are not discussed in further detail herein.

Display/control system 100 achieves low system latency in part by using the OSC protocol. Achieving overall low system latency can be particularly challenging when using a VR/AR headset with a limited processor. It may be necessary to transfer and process a large amount of information (e.g., messages and data). System latency can be reduced by reducing the time needed to transfer data and the time needed to process data. Hub 110, acting as an intermediary, may need to perform a substantial amount of processing to achieve both low latency and also accurate communication, which is particularly the case over a wireless channel. Thus, in many cases, network communications problems must be solved. Part of the solution is to use a protocol (e.g., OSC) that is specifically designed for transmitting music data across a network (e.g., transferring data between control unit 102 and DAW 104 wirelessly). OSC messages can be transmitted using various network technologies, e.g., transmission control protocol (TCP), user datagram protocol (UDP), and Ethernet. For this reason, plug-in 112 is embedded within DAW 104 and configured to communicate using a common protocol (e.g., OSC) as hub 110.

In various embodiments, plug-in 112 relays information communicated from hub 110 to other components of DAW 104 (not shown explicitly) associated with standard DAW operation. This communication is fast because it occurs internally within DAW 104 as opposed to over a slow channel (e.g., a wireless channel). Without plug-in 112, hub 110 may need to communicate directly with DAW 104 (e.g., through DAW interface(s) 114) using messages that are not as suited for network communication as OSC. By sending OSC messages over a slow channel (e.g., a wireless channel), latency is reduced. In various embodiments, VR/AR interface 116 is also configured to communicate with hub 110 using a protocol (e.g., OSC) suited for network communication. This is particularly useful when control unit 102 communicates with VR/AR headset 106 over a slow channel (e.g., a wireless channel).

Figure 2:
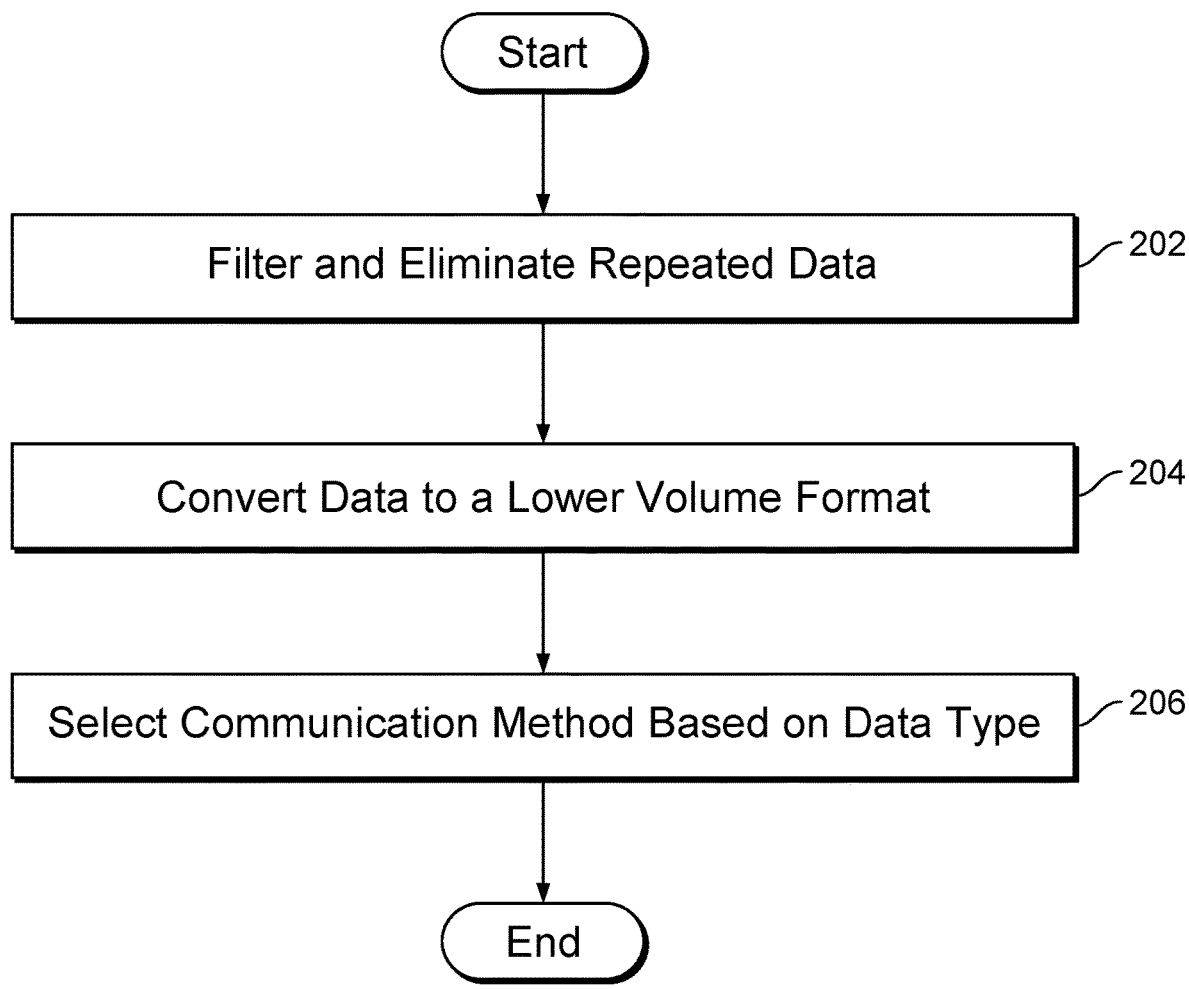
FIG. 2 is a flowchart illustrating an embodiment of a process for conducting reduced latency communications.

Additional steps that are performed to reduce system latency are illustrated in the example process of FIG. 2. The steps in FIG. 2 may be performed in an order different than what is shown. At 202, repeated data is filtered and eliminated. Many messages that are typically communicated (without message filtering) are duplicates. Information may be duplicated as a redundancy measure to ensure that there is no loss of data. Active filtering is performed to eliminate duplicate information and thus reduce latency. In various embodiments, elimination of duplicate information is based at least in part on the importance of the information. For example, duplicates of very important information, such as track name information, are not eliminated. On the other hand, duplicates of metering data (e.g., showing volume, frequency, and other sound attributes as they change in real time) are heavily filtered because loss of such data does not significantly affect user experience (e.g., because the data updates frequently and because operators/users do not typically pay close attention to or rely on such data). At 204, data (e.g., the filtered data) is converted to a lower volume format in order to further reduce the amount of data that needs to be transmitted. Stated alternatively, coding of the data is performed to reduce data volume. For example, in various embodiments, data (e.g., DAW parameter data) in a DAW-specific format is converted to a binary code by plug-in 112 of FIG. 1a for transfer from DAW 104 of FIG. 1a to control unit 102 of FIG. 1a. Hub 110 of FIG. 1a forwards this data to VR/AR headset 106 of FIG. 1a for display (with VR/AR interface 116 of FIG. 1a decoding the binary data into a format compatible with VR/AR headset 106). In various embodiments, data corresponding to virtual/augmented reality environment information (e.g., associated with virtual objects) that is transferred from VR/AR headset 106 to control unit 102 is also coded. Hub 110 can decode this data, process it to determine updated DAW parameters, and code the updated parameters for transmission to DAW 104 (with plug-in 112 decoding received data into a DAW-specific format). At 206, a communication method is selected based on the data type. For example, important data, such as the track name, is communicated using a more reliable/slower technology/method (e.g., TCP). Less important data (e.g., metering data) is communicated using a less reliable/faster technology/method (e.g., UDP).

In various embodiments, at least three audio input protocols (e.g., MIDI, HUI, and OSC) are used to achieve effective DAW communication across different DAW platforms. For example, certain DAW parameters are supported only via certain protocols. Even when DAW parameters can be communicated using multiple protocols, one protocol may be substantially more efficient. For example, in many cases, a higher level of granularity (e.g., greater detail/dynamic ranges) of certain DAW parameters can be achieved with OSC. In various embodiments, each DAW is handled differently for each control protocol. For example, the "play" command in HUI may need to be formatted in a slightly different manner for each DAW. In some instances, a control protocol is not needed for a specific DAW (e.g., HUI may not be needed if an API of the DAW replaces HUI functionality).

The different audio input protocols are used to control different DAW parameters. For example, controlling virtual drums typically requires MIDI, which is designed to send note data (e.g., pitch, intensity, and duration) as well as general control information. MIDI is suited for instrument data (e.g., drums, guitar, keyboard, etc.). Controlling play and pause typically requires HUI, which is used for mixer, transport control (play, pause, stop, fast forward, rewind, etc.), and timing (e.g., time location within a track) data. Another HUI parameter is automation mode. Automation off mode corresponds to no control data being written to a track (e.g., for vocals, turning volume up and down as the track plays affects the volume of the vocal, but no information is written for the DAW to record). In write mode, on the other hand, if the volume is adjusted, control information is written to the DAW. In read mode, a change snaps back to an original position. Touch mode corresponds to writing only occurring when a control is touched. Latch mode corresponds to recording at a position associated with where a control is released. Other HUI parameters include inserts (e.g., pieces of signal processing inserted into a track), DAW channel sends (e.g., sending an effect, such as an echo, to a portion of a track), and abbreviated track names (e.g., 4 or 5-character abbreviations, such as "VOCL" for vocal).

In many cases, retrieving track information from a DAW requires OSC because of technical limitations inherent to MIDI and HUI. For example, values associated with MIDI are limited to 0 through 127. Thus, volume levels for a track would be limited to 128 distinct values using the MIDI specification. OSC allows for greater control of detail (e.g., allowing for more than 128 distinct volume values). Plug-in 112 allows for OSC communication and can be loaded for each track encountered (e.g., a vocal track). Plug-in 112 processes DAW parameters within DAW 104 and can communicate with hub 110 using OSC. Use of plug-in 112 is DAW-dependent. In some cases, plug-in 112 is not needed if the DAW supports direct OSC communication without needing to use the plug-in. OSC is well-suited for communication of VR/AR data to plug-in 112 because OSC is designed for both high resolution and speed in terms of transmitting music data. Examples of parameters that are communicated using OSC include track name, metering/visualization parameters (including volume, frequency, and phase correlation), and other audio engineering parameters. Some of these parameters (e.g., volume), but not all (e.g., not frequency) can be communicated using HUI. None of these parameters can be communicated using MIDI. An example of a virtual object associated with volume is a mix sphere (e.g., see FIG. 9a). Additional OSC parameters include pan (position in a stereo field), equalization (e.g., of bass and treble), dynamics (e.g., see FIG. 11a), and the echo properties reverb and delay. Multiple OSC parameters can be controlled using a single virtual object. For example, a mix sphere (e.g., see FIG. 9a) can be configured to map three-dimensional position to three different parameters (e.g., x-axis to pan, y-axis to volume, and z-axis to additional processing, such as equalization, reverb, or delay). OSC can also be used in conjunction with another protocol. For example, OSC can be used with MIDI (e.g., see the virtual drums examples of FIGS. 5a-b and the large virtual fader examples of FIGS. 6a-b). For an example of OSC used in conjunction with HUI, see the wrist mounted transport control discussion associated with FIGS. 8a-b.

In the example illustrated in FIG. 1a, portions of the communication path between the components are shown. Other communication paths may exist, and the example of FIG. 1a has been simplified to illustrate the example clearly. Although single instances of components have been shown to simplify the diagram, additional instances of any of the components shown in FIG. 1a may exist. The number of components and the connections shown in FIG. 1a are merely illustrative. Components not shown in FIG. 1a may also exist. For example, speakers (e.g., headphones and surround sound speakers), wireless hardware and software, and VR/AR headset rendering hardware and software are not drawn explicitly.

FIG. 1b is a screenshot illustrating an example hub user interface. See above for the description associated with FIG. 1b.

FIG. 2 is a flowchart illustrating an embodiment of a process for conducting reduced latency communications. See above for the description associated with FIG. 2. In some embodiments, the process of FIG. 2 is performed by display/control system 100 of FIG. 1a.

Figure 3:
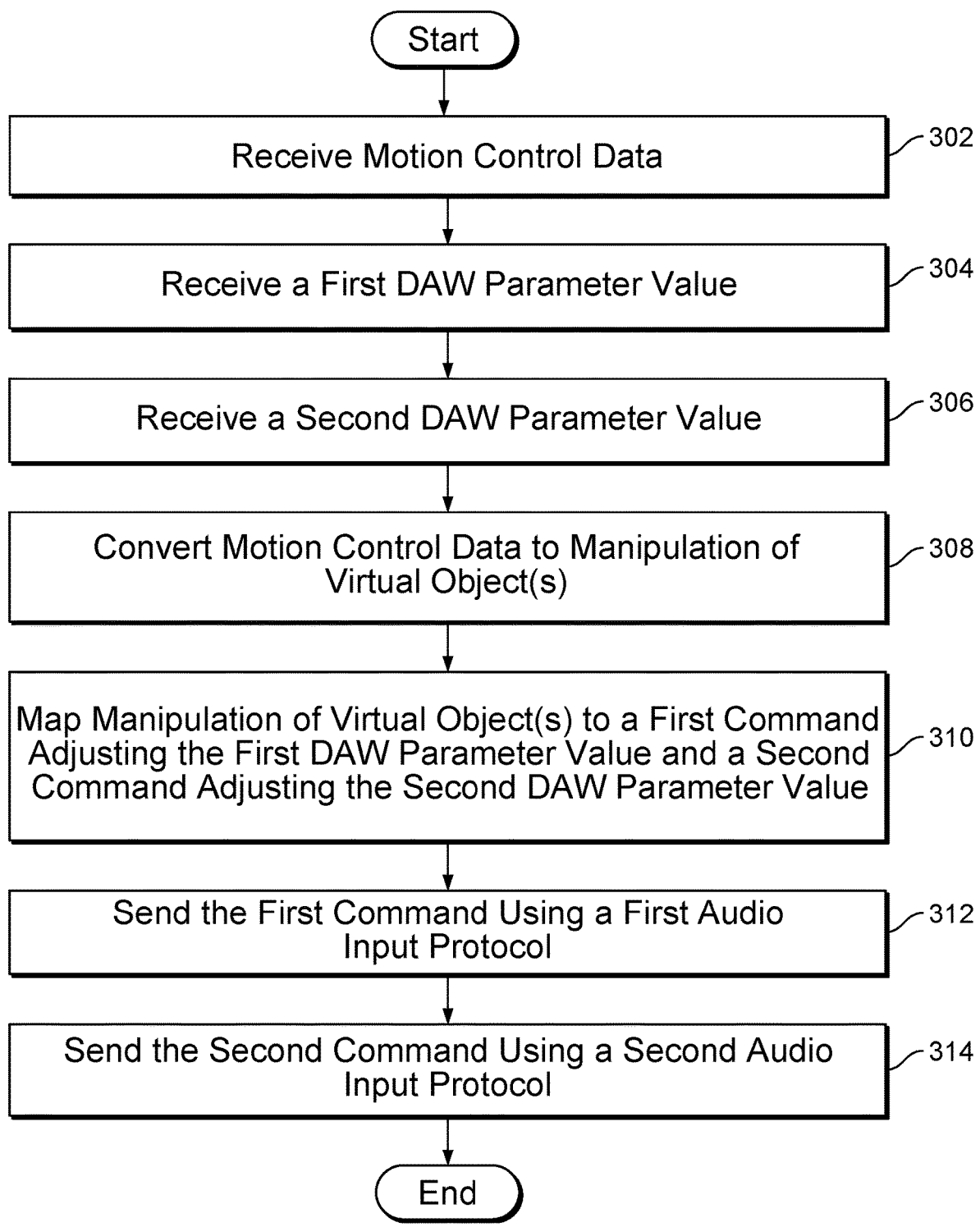
FIG. 3 is a flowchart illustrating an embodiment of a process for displaying and controlling multiple DAW parameters.

FIG. 3 is a flowchart illustrating an embodiment of a process for displaying and controlling multiple DAW parameters. In some embodiments, the process of FIG. 3 is performed by display/control system 100 of FIG. 1a.

At 302, motion control data is received. The motion control data is received from one or more sensors. Examples of sensors include motion sensors placed on one or more arms, hands, and fingers. In various embodiments, these sensors translate real-world motions (e.g., hand gestures, movements of body parts through space, grabbing motions, etc.) to similar corresponding motions in a virtual space. In addition, hand and finger movements can be used to input commands to one or more tracked controllers. In some embodiments, motion control data is received by hub 110 of FIG. 1a (e.g., by an interface component) from gesture trackers 108 of FIG. 1a.

At 304, a first DAW parameter value is received. In various embodiments, the parameter is associated with a music composition stored on a DAW. Examples of DAW parameters include instrument note parameters (e.g., on/off status, pitch, intensity, and duration), transport control parameters (e.g., play, pause, stop, fast forward, rewind, etc.), track time location, automation mode parameters, insert parameters, DAW channel send parameters, abbreviated track name, track name, metering/visualization parameters, volume, pan, dynamics, equalization, reverb, and delay. In some embodiments, the first DAW parameter value is received by hub 110 of FIG. 1a (e.g., by an interface component) from DAW 104 of FIG. 1a. In some embodiments, a virtual object representation corresponding to the first DAW parameter is displayed using VR/AR headset 106 of FIG. 1a. The position, conformation, configuration, or some other property of a virtual object can correspond to a current value of the first DAW parameter.

At 306, a second DAW parameter value is received. In various embodiments, this parameter is associated with the same music composition as the first DAW parameter and is a different parameter than the first DAW parameter. Examples of DAW parameters are given above. In various embodiments, the second DAW parameter value is also received by hub 110 of FIG. 1a (e.g., by an interface component) from DAW 104 of FIG. 1a. In various embodiments, a virtual object representation corresponding to the second DAW parameter is also displayed using VR/AR headset 106 of FIG. 1a. The position, conformation, configuration, or some other property of a virtual object can correspond to a current value of the second DAW parameter.

At 308, the motion control data is converted to one or more manipulations of one or more virtual objects. In the case of virtual drums (e.g., see FIGS. 5a-b), grabbing motions and hand/arm movements can be converted to movements of virtual drumsticks through a virtual space, including collisions with virtual drums if the virtual drumsticks and drums meet. In the case of virtual faders and sliders (e.g., see FIGS. 6a-b and FIG. 7), grabbing motions and hand/arm movements can be converted to virtual sliding of knobs movements. In the case of wrist mounted transport control (e.g., see FIGS. 8a-b), finger pushing motions can be converted into pressing of virtual buttons. In the case of virtual mix spheres and effects cubes (e.g., see FIG. 9a and FIG. 10a), grabbing motions and hand/arm movements can be converted to three-dimensional virtual object position movements. In the case of virtual dynamics pyramids (e.g., see FIG. 11a), various movements (e.g., grabbing and dragging movements) can be converted to conformation changes in the pyramids. Movements corresponding to control of a real-world console can be converted to corresponding virtual movements for a virtual console (e.g., see FIG. 12). Finger pointing and clicking movements can be converted to virtual laser pointing and clicking. Other movements and conversions are also possible. In some embodiments, hub 110 of FIG. 1a (e.g., a processor component) performs the conversion of the motion control data. In various embodiments, the virtual objects are displayed using VR/AR headset 106 of FIG. 1a. In some embodiments, rendering (e.g., using VR/AR headset 106 of FIG. 1a) of the one or more manipulations of the one or more virtual objects occurs after the motion control data is converted. It is also possible to perform the rendering after step 310, 312, or 314 if those steps are performed quickly enough for the operator/user to not perceive a significant delay (e.g., lag) in the updating of the virtual objects.

At 310, the one or more manipulations of the one or more virtual objects are mapped to at least a first command adjusting the first DAW parameter value and a second command adjusting the second DAW parameter value. In some embodiments, the mapping is performed by hub 110 of FIG. 1a (e.g., by a processor component). For example, a virtual drum collision can generate note data that depends on the specific movements of a virtual drumstick (e.g., where the drumstick strikes and how fast it is moving). Virtual fader and slider position can correspond to what a DAW parameter value (e.g., volume for a track) is adjusted to. A pressed button (e.g., for wrist mounted transport control) can toggle a DAW parameter (e.g., play versus pause for a track). The three-dimensional positions of mix spheres and effects cubes can correspond to values for three independent DAW parameters. The shape of a virtual dynamics pyramid can correspond to compression or other audio processing parameters. When a virtual fader or slider position changes, a command adjusting the parameter represented can be prepared to be sent (e.g., a command to increase or decrease a volume). Similarly, commands can be prepared to be sent when virtual buttons are pressed, mix spheres or effects cubes are moved, dynamics pyramids are manipulated, etc.

In the example illustrated, two DAW parameters values are received and adjusted. The two DAW parameter values do not necessarily need to be associated with the same virtual object. For example, the first DAW parameter value may be a volume associated with a first virtual fader or slider and the second DAW parameter value may be a frequency associated with a second virtual fader or slider. The two faders or sliders may be moved sequentially (with a noticeable delay between the two movements, in which case rendering of the manipulations of the faders or sliders is also performed sequentially as soon as the manipulations occur in order to avoid delay/lag in the user experience). The above also applies to two DAW parameters associated with two different virtual buttons. In various cases, the two DAW parameter values are associated with the same virtual object. For example, the first DAW parameter value may be a volume associated with movement of a mix sphere or effects cube along one axis in virtual/augmented reality space and the second DAW parameter value may be pan, equalization, reverb, or delay associated with movement of the mix sphere or effects cube along a different axis in virtual/augmented reality space. Thus, moving the mix sphere or effects cube in any direction other than purely along a single axis would result in adjusting two (or three) DAW parameter values.

At 312, the first command is sent (to the DAW being used) using a first audio input protocol recognized by the DAW. Examples of audio input protocols include MIDI, HUI, and OSC. In some embodiments, the first command is sent by hub 110 of FIG. 1a (e.g., by a processor component) to DAW 104 of FIG. 1a.

At 314, the second command is sent (to the DAW being used) using a second audio input protocol recognized by the DAW. The second audio input protocol is a different protocol than the first audio input protocol. For example, if the first audio input protocol is MIDI, the second audio protocol could be HUI, OSC, etc. (but not MIDI). More than one type of audio input protocol can be used because multiple audio input protocols are supported (e.g., by display/control system 100 of FIG. 1a). Certain DAW parameter values are more effectively handled using certain audio input protocols (in general and particularly for specifics DAWs). Thus, certain combinations of DAW parameter value adjustments are more effectively handled by using multiple protocols, with each protocol tailored to the DAW parameter. In some embodiments, the second command is sent by hub 110 of FIG. 1a to DAW 104 of FIG. 1a (e.g., by a processor component).

Figure 4:
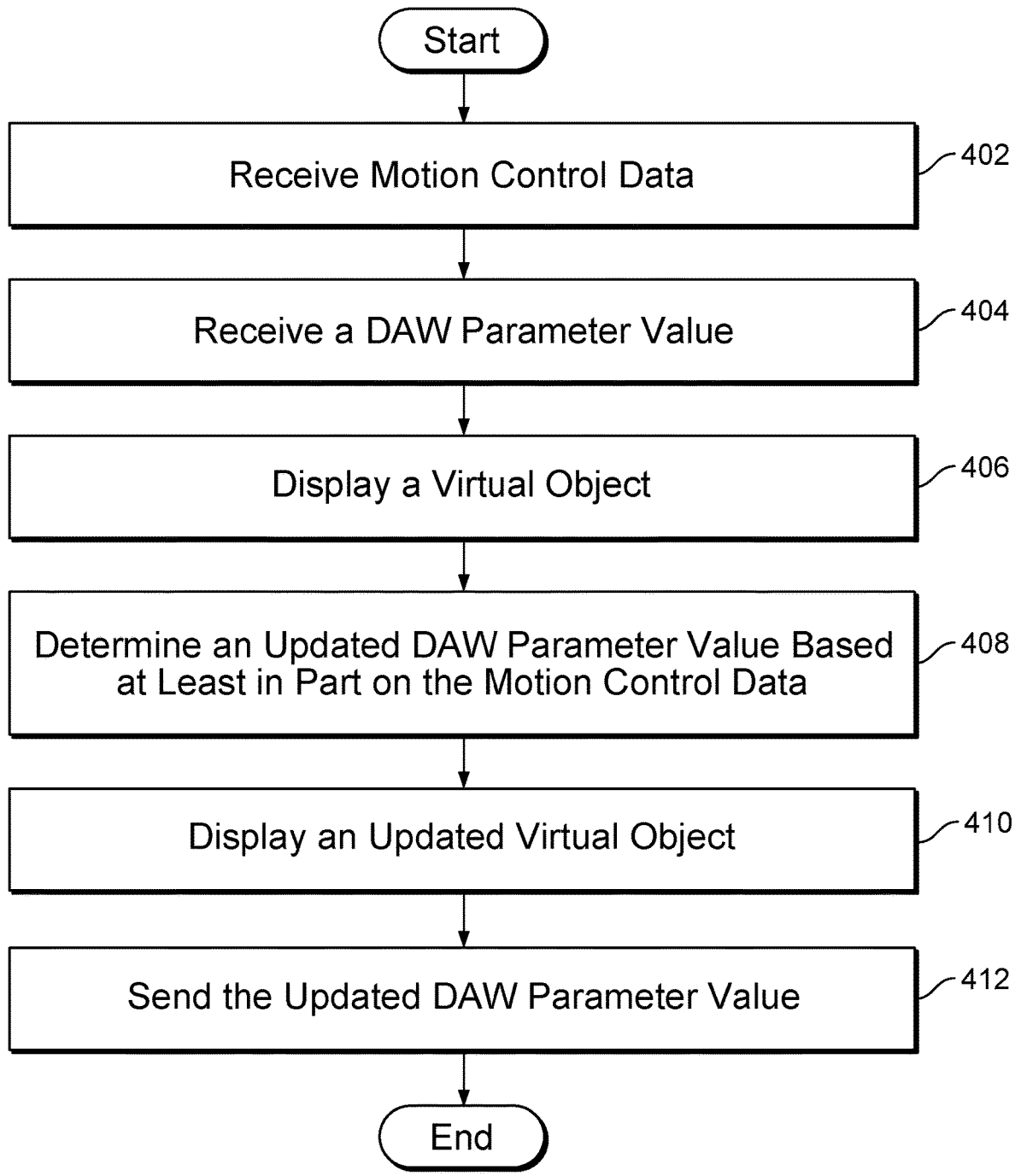
FIG. 4 is a flowchart illustrating an embodiment of a process for displaying and controlling a single DAW parameter.

FIG. 4 is a flowchart illustrating an embodiment of a process for displaying and controlling a single DAW parameter. In some embodiments, the process of FIG. 4 is performed by display/control system 100 of FIG. 1a.

At 402, motion control data is received. The motion control data is received from one or more sensors. Examples of sensors include motion sensors placed on one or more arms, hands, and fingers. In various embodiments, these sensors translate real-world motions (e.g., hand gestures, movements of body parts through space, grabbing motions, etc.) to similar corresponding motions in a virtual space. In addition, hand and finger movements can be used to input commands to one or more tracked controllers. In some embodiments, motion control data is received by hub 110 of FIG. 1a (e.g., by an interface component) from gesture trackers 108 of FIG. 1a.

At 404, a DAW parameter value is received. In various embodiments, the DAW parameter is associated with a music composition. Examples of DAW parameters include instrument note parameters (e.g., on/off status, pitch, intensity, and duration), transport control parameters (e.g., play, pause, stop, fast forward, rewind, etc.), track time location, automation mode parameters, insert parameters, DAW channel send parameters, abbreviated track name, track name, metering/visualization parameters, volume, pan, dynamics, equalization, reverb, and delay. In some embodiments, the DAW parameter value is received by hub 110 of FIG. 1a (e.g., by an interface component) from DAW 104 of FIG. 1a.

At 406, a virtual object is displayed. In some embodiments, a virtual object representation corresponding to the DAW parameter is displayed using VR/AR headset 106 of FIG. 1a (e.g., by a processor component). The position, conformation, configuration, or some other property of the virtual object can correspond to a current value of the DAW parameter. Changes to the parameter value map to position, conformation, configuration, or other changes of the virtual object. Stated alternatively, these changes map to updates of the virtual object.

At 408, an updated DAW parameter value is determined based at least in part on the motion control data. In various embodiments, the motion control data includes movements (e.g., arm, hand, finger, etc.) movements that correspond to movements in a virtual space that result in a virtual object being moved, altered, or otherwise manipulated. When specified movements (corresponding to specified virtual object manipulations) are detected, specified adjustments to a DAW parameter value are indicated. Stated alternatively, specified virtual object manipulations are mapped to specified adjustments to DAW parameter values. Thus, an updated DAW parameter value can be determined. See step 308 of FIG. 3 for various examples of movements and their association with various types of virtual objects. See step 310 of FIG. 3 for various examples of mappings of virtual object manipulations to DAW parameter value adjustments. In some embodiments, hub 110 of FIG. 1a (e.g., a processor component) determines the updated DAW parameter value.

At 410, an updated virtual object is displayed (based on the virtual object manipulations). In various embodiments, the virtual objects are displayed/rendered using VR/AR headset 106 of FIG. 1a. In some embodiments, hub 110 of FIG. 1a (e.g., a processor component) directs VR/AR interface 116 of FIG. 1a to display/render the updated virtual object. Rendering (e.g., using VR/AR headset 106 of FIG. 1a) of the updated virtual object can occur at the same time that the updated DAW parameter value is determined (e.g., at the same time as the interaction between motion control data and the virtual object is determined). Rendering can also occur after step 412 if the delay does not affect user experience.

At 412, the updated DAW parameter value is sent (to the DAW being used). The updated DAW parameter value is sent using an audio input protocol (e.g., MIDI, HUI, or OSC). In some embodiments, the updated DAW parameter value is sent by hub 110 of FIG. 1a (e.g., by a processor component) to DAW 104 of FIG. 1a.

Figure 5A:
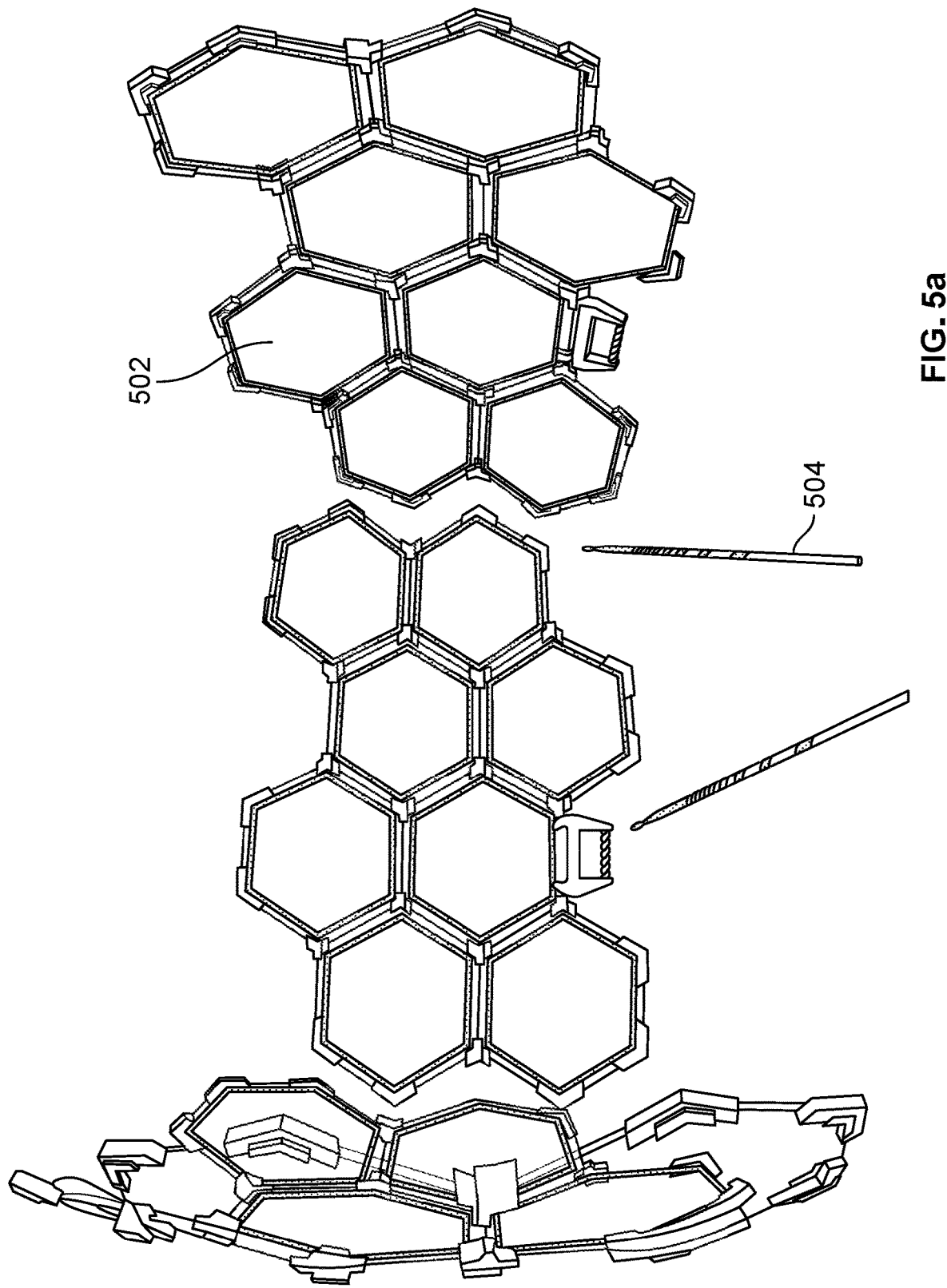
FIG. 5a is a screenshot illustrating an example of virtual drums.

FIG. 5a is a screenshot illustrating an example of virtual drums. In some embodiments, the virtual drums are generated by hub 110 and rendered by VR/AR headset 106 of FIG. 1a. The example shown includes a plurality of virtual drum pads (e.g., individual drum pad 502) and one or more virtual drumsticks (e.g., virtual drumstick 504). The drum pads are moveable and can be arranged in the virtual/augmented reality space according to an operator/user's preference. In the example shown, three sets of drum pads form an enclosure with three sides. The drum pads and drumsticks form a velocity sensitive system that outputs MIDI notes or other data to control parameters or instruments in the DAW (e.g., DAW 104 of FIG. 1a). In various embodiments, velocity is calculated by measuring velocity of a collision between a virtual drumstick and a virtual drum pad. The velocity can be calculated based on movements of gesture trackers (e.g., gesture trackers 108 of FIG. 1a). For example, velocity can be calculated as a distance moved by a hand sensor (corresponding to a virtual hand holding a virtual drumstick) divided by the time taken for the hand sensor to move that distance. In some embodiments, haptic feedback is incorporated such that force feedback is provided to the operator/user when a collision occurs. See FIG. 11b for additional discussion related to haptic feedback.

Figure 5B:
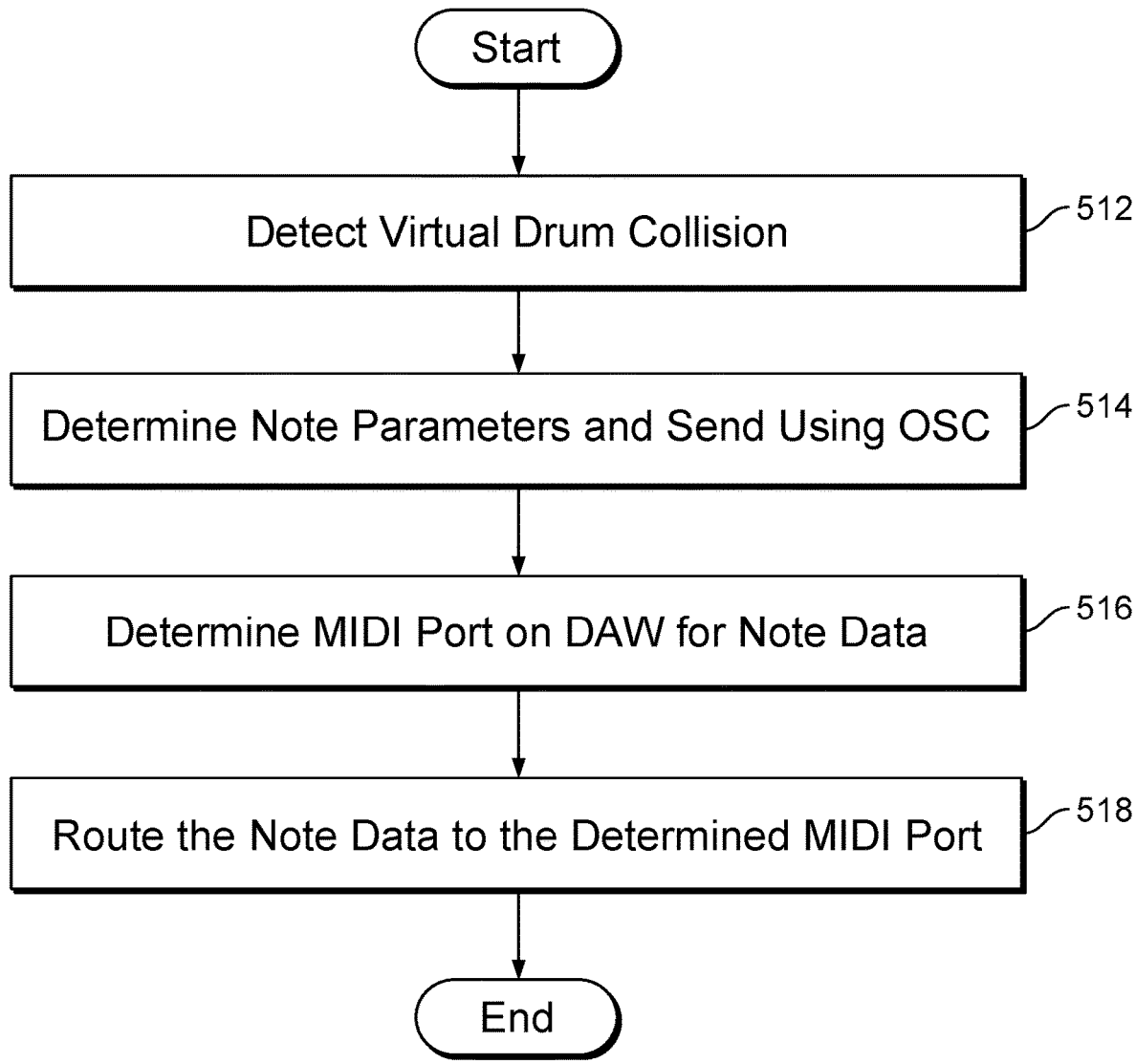
FIG. 5b is a flowchart illustrating an embodiment of a process for DAW parameter display and control associated with virtual drums.

FIG. 5b is a flowchart illustrating an embodiment of a process for DAW parameter display and control associated with virtual drums. In some embodiments, at least a portion of the process of FIG. 5b is performed in one or more steps of FIG. 3 or FIG. 4. In some embodiments, the process of FIG. 5b is a special case of the process of FIG. 3 or the process of FIG. 4. In some embodiments, the process of FIG. 5b is performed by display/control system 100 of FIG. 1a.

At 512, a virtual drum collision is detected. For example, a virtual drum collision is detected when virtual drumstick 504 coincides in virtual/augmented reality space with virtual drum pad 502. In some embodiments, this collision is detected by control unit 102 of FIG. 1a. It is also possible for software within VR/AR headset 106 of FIG. 1a to detect the collision and communicate the detection (and associated collision data) to control unit 102.

At 514, note parameters are determined and sent using OSC. Example note parameters (the note data) include on/off status, pitch, intensity, and duration. After the virtual drum collision is detected, a note is registered and the on/off status of the note becomes on. In various embodiments, the velocity of the collision is measured and interpolated into a value associated with note intensity. Pitch and duration can also be associated with characteristics of the collision as well as which drum pad is hit. In the example shown, the note data is translated into OSC data for transmission (e.g., from VR/AR interface 116 of FIG. 1a to hub 110 of FIG. 1a to plug-in 112 of FIG. 1a if the OSC data is generated by VR/AR headset 106 of FIG. 1a). It is also possible for the OSC data to be generated by control unit 102 of FIG. 1a. As described previously, instrument note data is associated with the MIDI protocol. In the example shown, the note data is translated to OSC data in order to facilitate faster transmission to reduce system latency. In various embodiments, the OSC data is converted back to a MIDI format when it is received by a DAW.

At 516, a MIDI port to use on the DAW for the note data is determined. Stated alternatively, where the instrument note data should be routed to within the DAW is determined and a MIDI port for receiving the note data is opened. In some embodiments, this MIDI port mapping is performed by plug-in 112 of FIG. 1a.

At 518, the note data is routed to the determined MIDI port. The note data is routed to the MIDI port that has been opened up in the DAW. In some embodiments, the routing is performed by plug-in 112 of FIG. 1a. In various embodiments, once the MID port is opened, the DAW continuously listens. Note data can be continuously transmitted to the DAW for as long as the on/off status of the note is on. If a virtual hand holding the virtual drumstick leaves the virtual drum area, the on/off status may be changed to off. The process of FIG. 5b is an example of OSC and MIDI protocols being used together to transmit DAW parameter values (instrument note data) in association a particular virtual object.

Figure 6A:
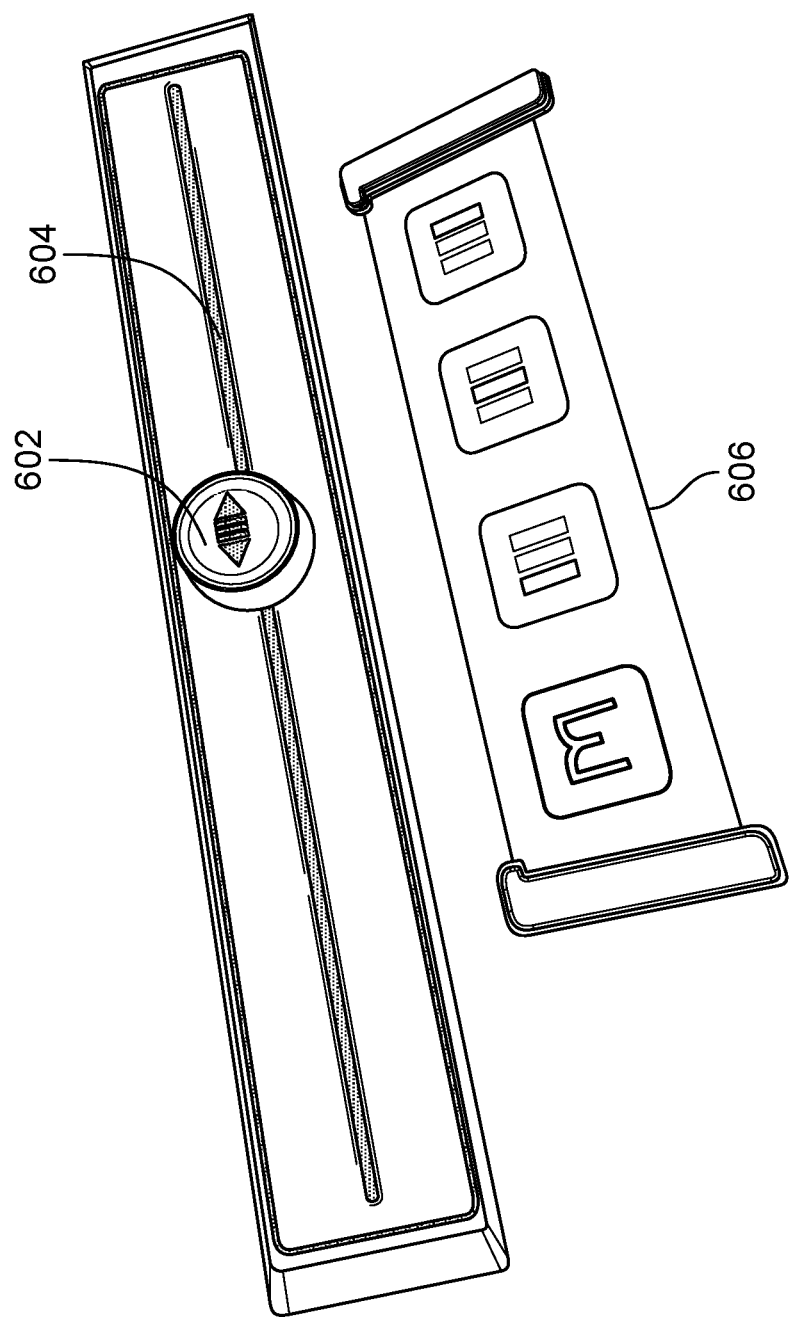
FIG. 6a is a screenshot illustrating an example of a large virtual fader.

FIG. 6a is a screenshot illustrating an example of a large virtual fader. In some embodiments, the large virtual fader (also referred to herein as a BFF) is generated by hub 110 and rendered by VR/AR headset 106 of FIG. 1a. The example shown includes knob 602 and slider track 604 along which knob 602 can be moved after it is grabbed. Where knob 602 is along slider track 604 corresponds to a DAW parameter (e.g., volume, wherein left to right movement corresponds to increasing volume). In various embodiments, gesture trackers (e.g., gesture trackers 108 of FIG. 1a) are used to provide motion control data corresponding to grabbing of knob 602 and its movement along slider track 604. The large virtual fader is an assignable fader that allows the operator/user to manipulate a DAW parameter of the operator/user's choice (e.g., as selected using the example hub interface of FIG. 1b). In various embodiments, the large virtual fader is several times larger than its traditionally small-scale non-virtual counterpart (e.g., a graphical user interface fader manipulated with a mouse or a real-world fader manipulated with a hardware controller). Being large means the larger virtual fader translates traditionally small-scale parameter adjustment into full body scale gestures, which allows for greater granularity and expressiveness with respect to control of parameters. In the example shown, buttons 606 allow the operator/user to switch between multiple mapped parameters (mapped to various large virtual faders). In some embodiments, knob 602 can be rotated to adjust a separate DAW parameter (different from the DAW parameter adjusted by sliding knob 602 along slider track 604).

Figure 6B:
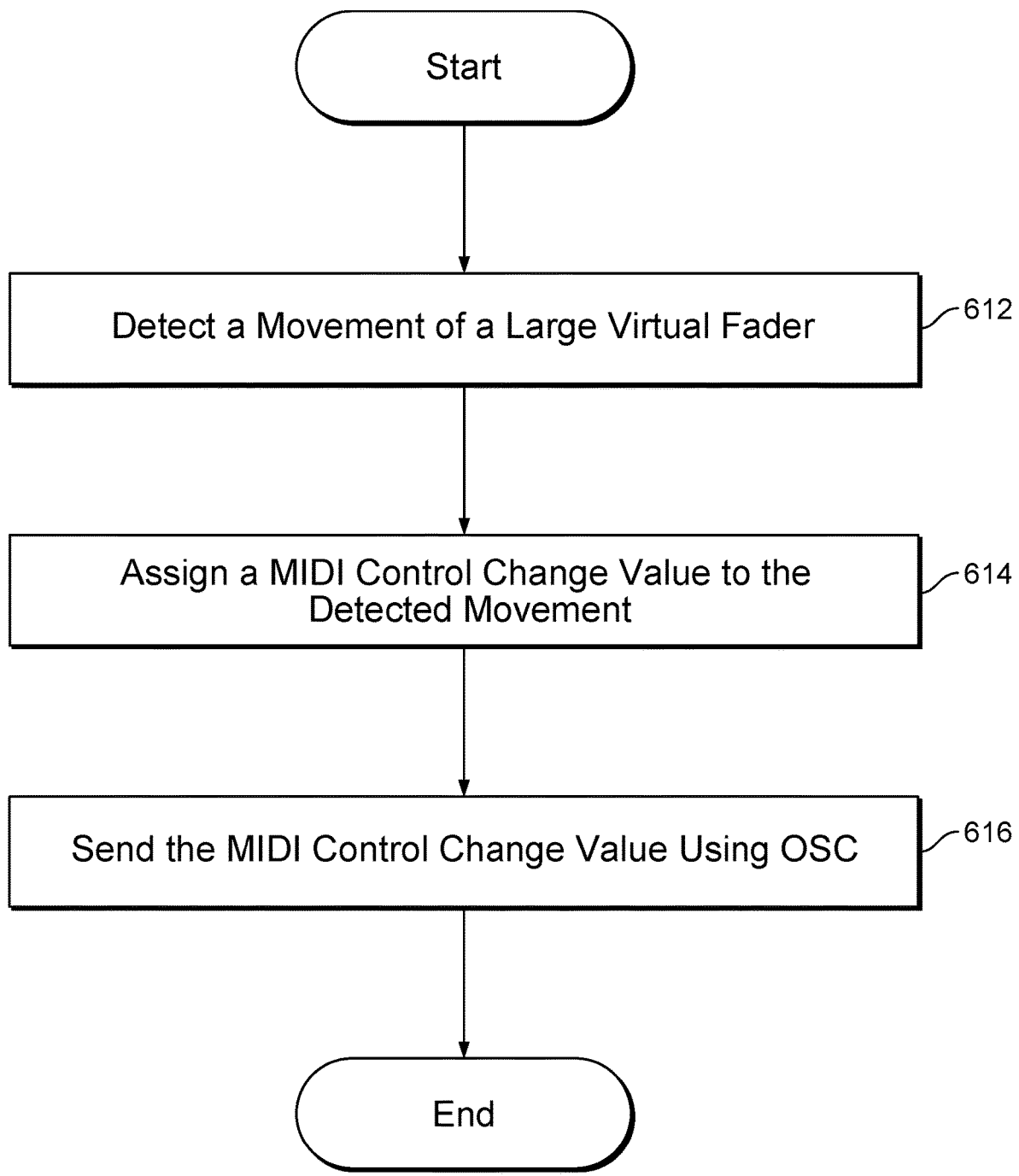
FIG. 6b is a flowchart illustrating an embodiment of a process for DAW parameter display and control associated with a large virtual fader.

FIG. 6b is a flowchart illustrating an embodiment of a process for DAW parameter display and control associated with a large virtual fader. In some embodiments, at least a portion of the process of FIG. 6b is performed in one or more steps of FIG. 3 or FIG. 4. In some embodiments, the process of FIG. 6b is a special case of the process of FIG. 3 or the process of FIG. 4. In some embodiments, the process of FIG. 6b is performed by display/control system 100 of FIG. 1a.

At 612, a movement of a large virtual fader is detected. For example, a movement of knob 602 is detected when a virtual hand coincides with knob 602 in virtual space and then a dragging motion of the virtual hand occurs. The position of knob 602 is calculated after the dragging motion. The large virtual fader can be used to control volume, the value of a filter, or any other DAW parameter. In some embodiments, the movement is detected by control unit 102 of FIG. 1*a*. It is also possible for software within VR/AR headset 106 of FIG. 1*a* to detect the movement and communicate the detection to control unit 102.

At 614, a MIDI control change value is assigned to the detected movement. In some embodiments, the MIDI control change value is determined by hub 110 of FIG. 1*a*. It is also possible for software within VR/AR headset 106 of FIG. 1*a* to determine the MIDI control change value and communicate it to hub 110 of FIG. 1*a*. In various embodiments, the MIDI control change value is a value from 0 and 127 (as set out in the MIDI specification) and is assigned to a movement of a virtual object, such as the large virtual fader. It is mapped to the movement of the virtual object, with 0 being a minimum movement and 127 being a maximum movement. In various embodiments, a MIDI control number is also assigned to the virtual object. The MIDI control number may be assigned by hub 110 and plug-in 112 of FIG. 1*a* operating in conjunction with each other. In various embodiments, the MIDI control number identifies which DAW object (e.g., which DAW knob that corresponds to knob 602) is being controlled. In various embodiments, a movement of the large virtual fader in virtual/augmented reality space is interpolated to a control change value from 0 to 127 and this information (along with a MIDI control number) needs to be communicated to the DAW being used in order to update the DAW parameter value associated with the larger virtual fader.

At 616, the MIDI control change value (along with the MIDI control number) is sent using OSC. In some embodiments, this data is first sent from VR/AR interface 116 of FIG. 1*a* to hub 110 of FIG. 1*a*. Regardless of where the data originates, it is sent from hub 110 of FIG. 1*a* to DAW 104 of FIG. 1*a*. In various embodiments, the data is translated into OSC data for transmission from hub 110 to plug-in 112 of FIG. 1*a*. If OSC is not used, it is possible to send the data from hub 110 to DAW interface(s) 114 of FIG. 1. As described previously, OSC can be advantageous in terms of reducing system latency. In various embodiments, OSC data is converted back to a MIDI format (e.g., by plug-in 112 of FIG. 1*a*) when it is received. DAW 104 uses the MIDI control number to determine which DAW parameter to update and uses the MIDI control change value to determine by what amount to update the DAW parameter. The process of FIG. 6*b* is an example of OSC and MIDI protocols being used together to transmit DAW parameter values associated with a virtual object.

Figure 7:
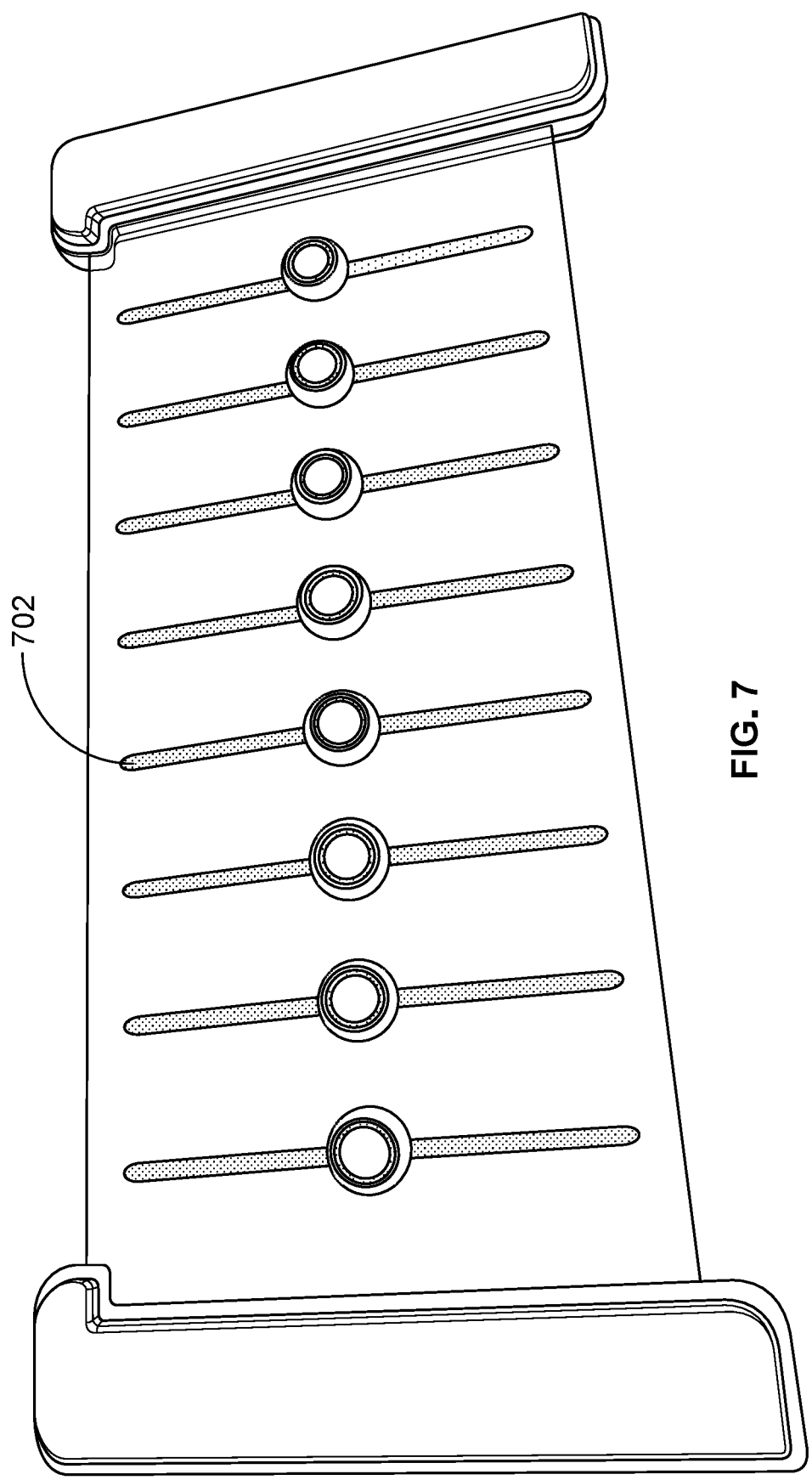
FIG. 7 is a screenshot illustrating an example of a set of virtual sliders.

FIG. 7 is a screenshot illustrating an example of a set of virtual sliders. In some embodiments, the set of virtual sliders is generated by hub 110 and rendered by VR/AR headset 106 of FIG. 1*a*. In the example illustrated, the set of virtual sliders includes a plurality of individual virtual sliders (e.g., virtual slider 702). Each individual slider operates in a manner similar to the large virtual fader of FIG. 6*a*. Each individual virtual slider has the same basic shape as the large virtual fader except that the orientation is vertical instead of horizontal. Stated alternatively, knobs can be grabbed and moved along slider tracks to adjust DAW parameter values mapped to the individual virtual sliders. In various embodiments, gesture trackers (e.g., gesture trackers 108 of FIG. 1*a*) are used to provide motion control data corresponding to grabbing of knobs and their movement along slider tracks. The virtual sliders allow the operator/user to manipulate DAW parameters of the operator/user's choice (e.g., as selected using the example hub interface of FIG. 1*b*). The process of FIG. 6*b* is also applicable, by analogy, to each individual virtual slider.

Figure 8A:
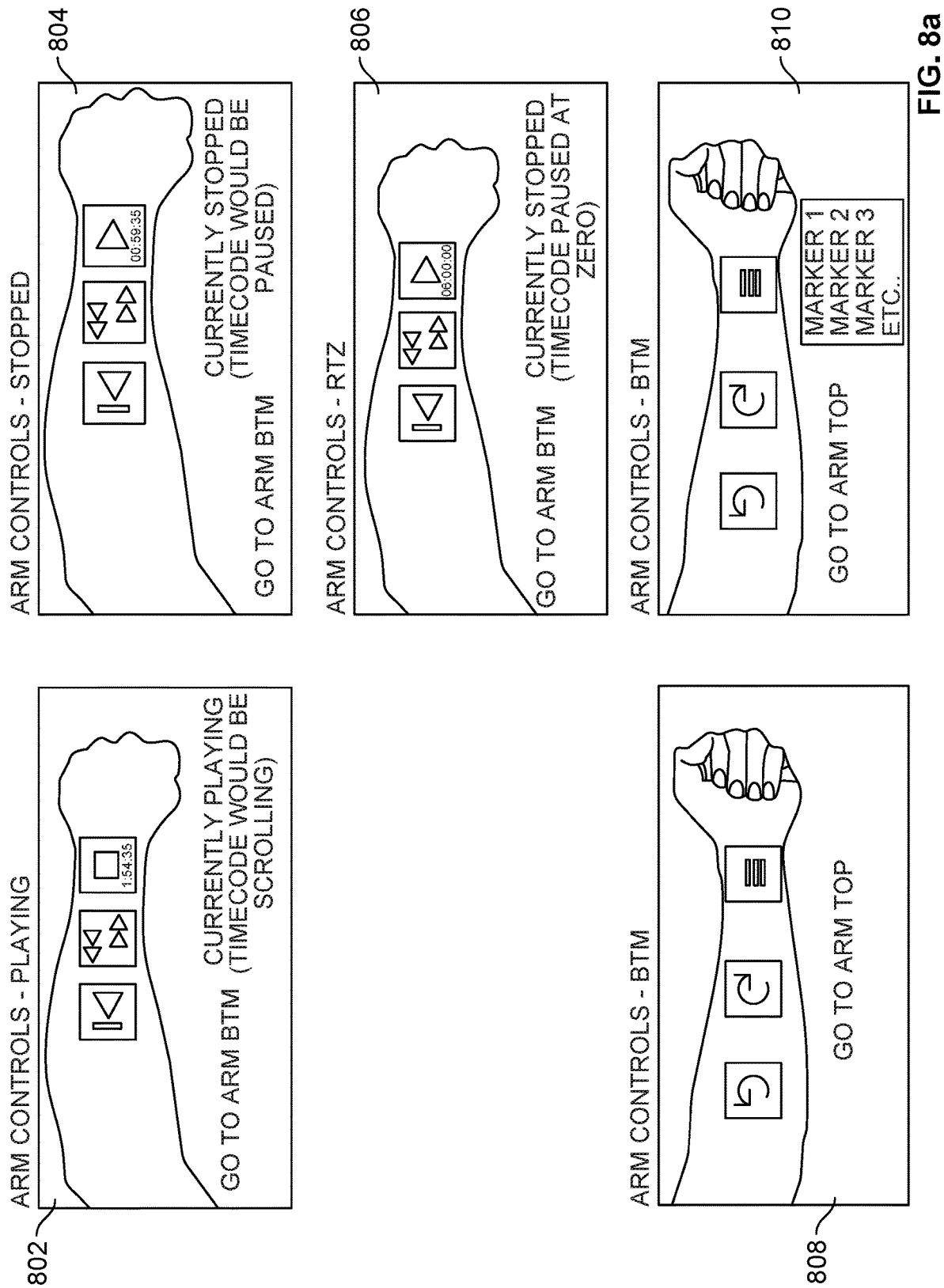
FIG. 8a is an illustration showing an example of wrist mounted transport control.

FIG. 8*a* is an illustration showing an example of wrist mounted transport control. Images 802, 804, 806, 808, and 810 illustrate wrist mounted transport control in various configurations. The examples show a real-world arm with controls overlaid (e.g., an augmented reality configuration). The functionality would be the same with the controls overlaid on a virtual arm. In various embodiments, a virtual arm and the wrist mounted transport controls are generated by hub 110 and rendered by VR/AR headset 106 of FIG. 1*a*. Wrist mounted transport control is typically used for session navigation (e.g., play, pause, stop, fast forward, rewind, etc.). Attaching these commonly used DAW controls to the operator/user's virtual arm provides easy access to session navigation functions. Image 802 shows an example of a session currently playing. Return to track beginning, fast forward, rewind, and stop buttons are shown. In various embodiments, a timecode would also be scrolling. Image 804 shows an example of a stopped session. The stop button is replaced by a play button and the timecode would be paused. Image 806 is similar to 804 except that that the session either has not started or has been reset, in which case the timecode would be paused at zero. Image 808 shows an example of buttons positioned on the bottom arm side. In the example shown, back, forward, and menu buttons are present. Image 810 shows an example of the menu button being pressed, which brings up several menu options.

In various embodiments, gesture trackers (e.g., gesture trackers 108 of FIG. 1*a*) are used to provide motion control data corresponding to pressing of the buttons (e.g., with a finger) of the wrist mounted transport controls. Gesture trackers can track movements of the arm with the wrist mounted transport controls as well as the hand on the other arm. In some embodiments, the buttons illustrated hover above the virtual arm with the wrist mounted transport controls. When virtual fingers coincide in virtual space with the hovering buttons, button presses can be registered. In some embodiments, a piece of hardware (e.g., a watch) with the same functionality transport controls can be worn by the operator/user to control sessions outside of the AR/VR environment. Thus, the operator/user could have access to commonly used, basic session controls (e.g., recording, listening to playback, etc.) while having the additional mobility (e.g., to walk around the recording studio) from not being attached to AR/VR hardware.

Figure 8B:
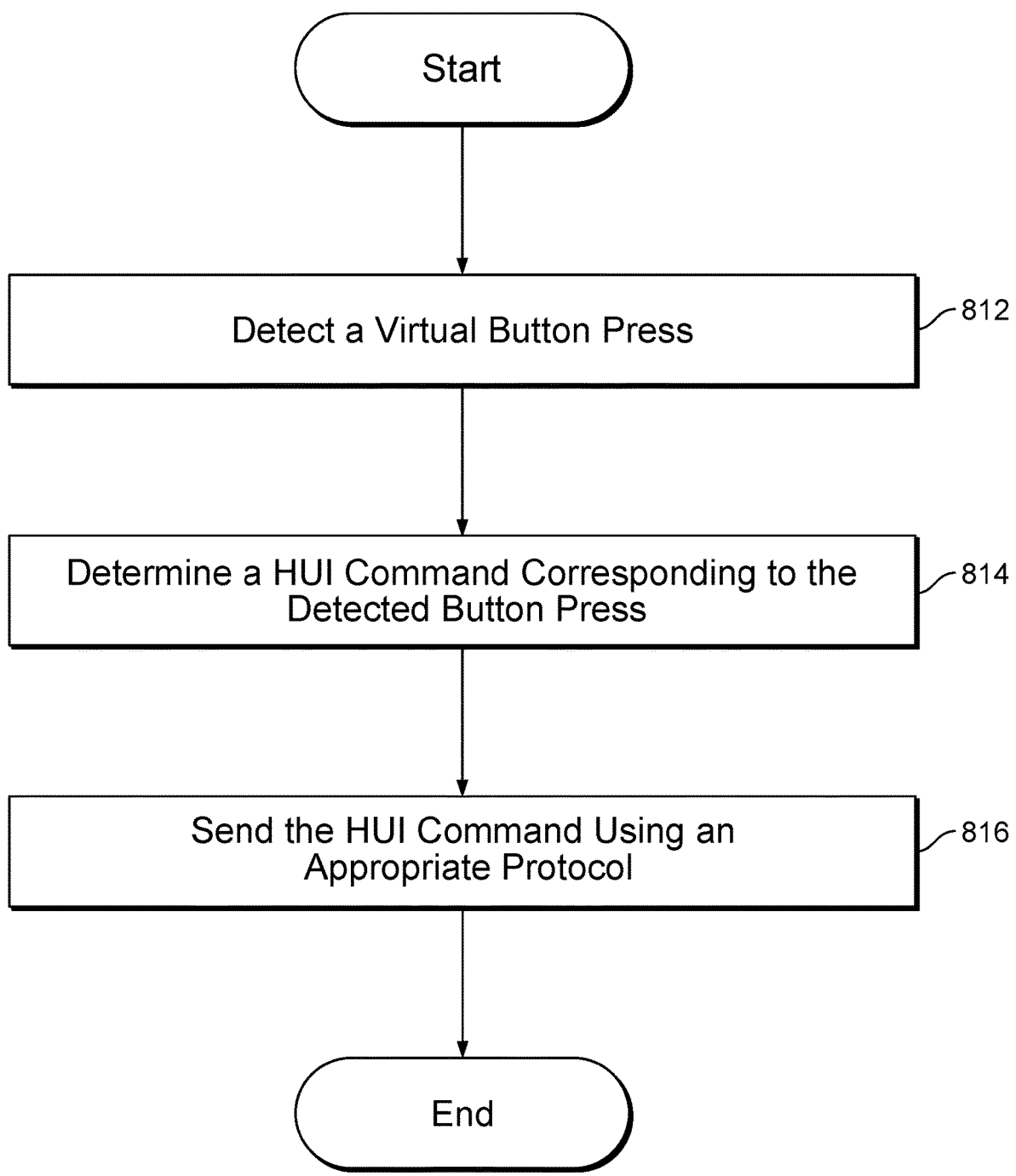
FIG. 8b is a flowchart illustrating an embodiment of a process for DAW parameter display and control associated with wrist mounted transport control.

FIG. 8*b* is a flowchart illustrating an embodiment of a process for DAW parameter display and control associated with wrist mounted transport control. In some embodiments, at least a portion of the process of FIG. 8*b* is performed in one or more steps of FIG. 3 or FIG. 4. In some embodiments, the process of FIG. 8*b* is a special case of the process of FIG. 3 or the process of FIG. 4. In some embodiments, the process of FIG. 8*b* is performed by display/control system 100 of FIG. 1*a*.

At 812, a virtual button press is detected. For example, a virtual button press is detected when a virtual finger coincides with a virtual button in virtual/augmented reality space followed by a finger clicking gesture (e.g., based on motion control data provided by gesture trackers 108 of FIG. 1*a*). In various embodiments, the virtual button is part of wrist mounted transport controls and hovers above a virtual arm. In various embodiments, the virtual buttons of the wrist mounted transport controls follow the operator/user in the virtual/augmented reality environment and give the operator/user the sensation of buttons hovering over a real-world arm. In some embodiments, the virtual button press is detected by control unit 102 of FIG. 1*a*. It is also possible for software within VR/AR headset 106 of FIG. 1*a* to detect the virtual button press and communicate the detection to control unit 102.

At 814, a HUI command corresponding to the detected button press is determined. Wrist mounted transport controls (e.g., play, pause, stop, fast forward, rewind, etc.) typically use HUI. In various embodiments, each specific transport control (e.g., play, pause, stop, fast forward, rewind, etc.) is mapped to a specific HUI command that needs to be communicated to a host DAW (the DAW being used). In some embodiments, software within VR/AR headset 106 of FIG. 1*a* generates the HUI command after detection of a button press associated with the transport control mapped to the HUI command and forwards the HUI command to hub 110 of FIG. 1*a*. It is also possible for the HUI command to originate in hub 110.

At 816, the HUI command is sent using an appropriate protocol. In some embodiments, the HUI command is communicated from VR/AR interface 116 of FIG. 1*a* to hub 110 of FIG. 1*a* to plug-in 112 of FIG. 1*a* if the HUI command originates from VR/AR headset 106 of FIG. 1*a*. It is also possible for the HUI command to originate from control unit 102 of FIG. 1*a*. In various embodiments, hub 110 of FIG. 1*a* determines a protocol for communication of the HUI command based on which specific DAW is being used (e.g., based on a DAW profile). Some DAWs require the command to be sent to the host DAW over a HUI connection, in which case, hub 110 of FIG. 1*a* can communicate with DAW interface(s) 114 of FIG. 1*a*. Some DAWs allow OSC communication, in which case HUI data can be translated to OSC data and communicated between hub 110 of FIG. 1*a* and plug-in 112 of FIG. 1*a*. For some DAWs, transport control commands are mapped to MIDI notes. The process of FIG. 8*b* is an example of OSC and HUI protocols being used together to transmit a DAW parameter value associated with a virtual object.

Figure 9A:
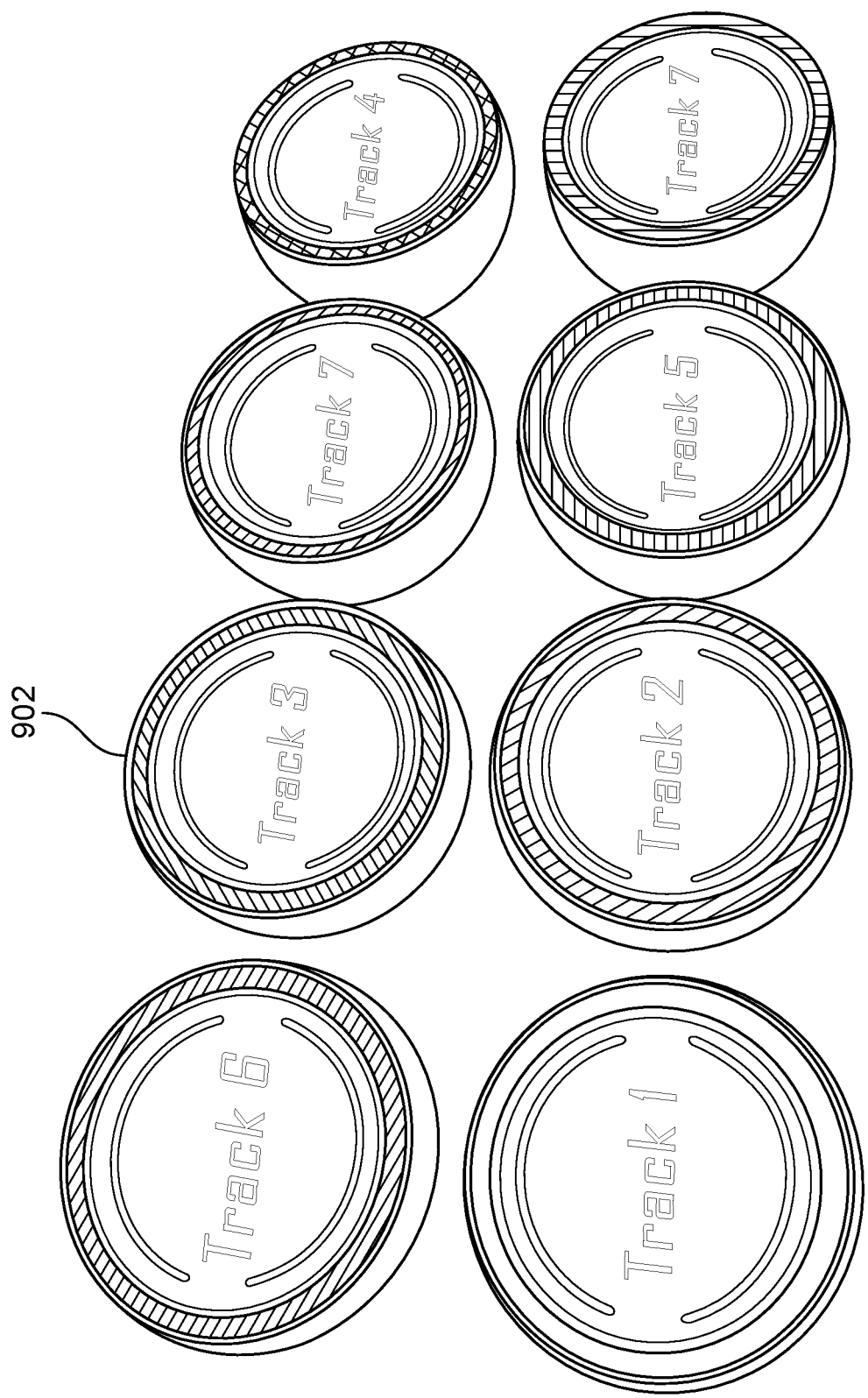
FIG. 9a is a screenshot illustrating an example of a set of virtual mix spheres.

FIG. 9*a* is a screenshot illustrating an example of a set of virtual mix spheres. In some embodiments, the virtual mix spheres are generated by hub 110 and rendered by VR/AR headset 106 of FIG. 1*a*. The example shown includes a plurality of virtual mix spheres (e.g., individual mix sphere 902). The virtual mix spheres are moveable and their initial positions can be arranged in the virtual/augmented reality space according to an operator/user's preference. In various embodiments, each mix sphere represents a track or instrument in a session (e.g., a piece of audio). In the example shown, each mix sphere controls a track. In a typical configuration, each mix sphere's position in space correlates to a set of DAW parameter values for each particular track or instrument. For example, moving a mix sphere up and down (y-axis) can adjust volume (e.g., up corresponds to louder volume), moving the mix sphere left and right (x-axis) can control pan (where the sound appears in a stereo field, such as from left/right speakers), and bringing the mix sphere forward or backward (z-axis) can map to any other desired parameter or signal processing algorithm (e.g., equalization, delay, reverb, etc.). In various embodiments, x-axis movement controls pan, y-axis movement controls volume, and z-axis movement controls a digital signal processing proximity algorithm that simulates perceived distance of a sound. Z-axis movement toward the operator/user positions the sound closer to the operator/user and makes it sound more immediate and present while z-axis movement away from the operator/user makes the sound appear more distant. In various embodiments, the digital signal processing proximity algorithm is implemented within plug-in 112 of FIG. 1*a*. Stated alternatively, z-axis movement can control a digital signal processing algorithm (e.g., proximity algorithm) in plug-in 112 of FIG. 1*a*.

In some embodiments, metering information (e.g., volume, frequency, bass, treble, etc.) is displayed on the mix spheres to illustrate what sounds are active. In some embodiments, rotation of the mix spheres is used to manipulate additional DAW parameters. In some embodiments, all DAW parameters associated with a mix sphere are communicated using OSC. Because the mapping of DAW parameters to mix sphere movement (in three dimensions and rotation) is according to the operator/user's preference (e.g., using the example hub user interface of FIG. 1*b*), it is also possible that the various movement dimensions correspond to different audio input protocols (e.g., up/down movement mapping to a first DAW parameter communicated using OSC, left/right movement mapping to a second DAW parameter communicated using HUI, forward/backward movement mapping to a third DAW parameter communicated using MIDI, or any other combination of mappings).

Figure 9B:
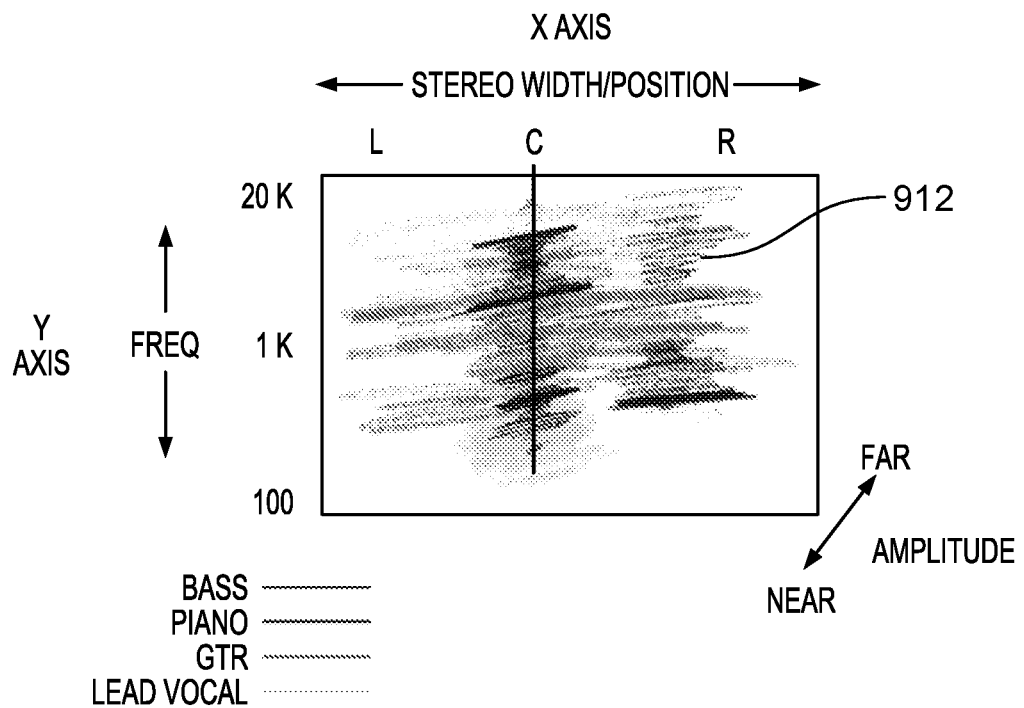
FIG. 9b illustrates an example of a visualization technique to display frequency and stereo information.
Figure 9B:
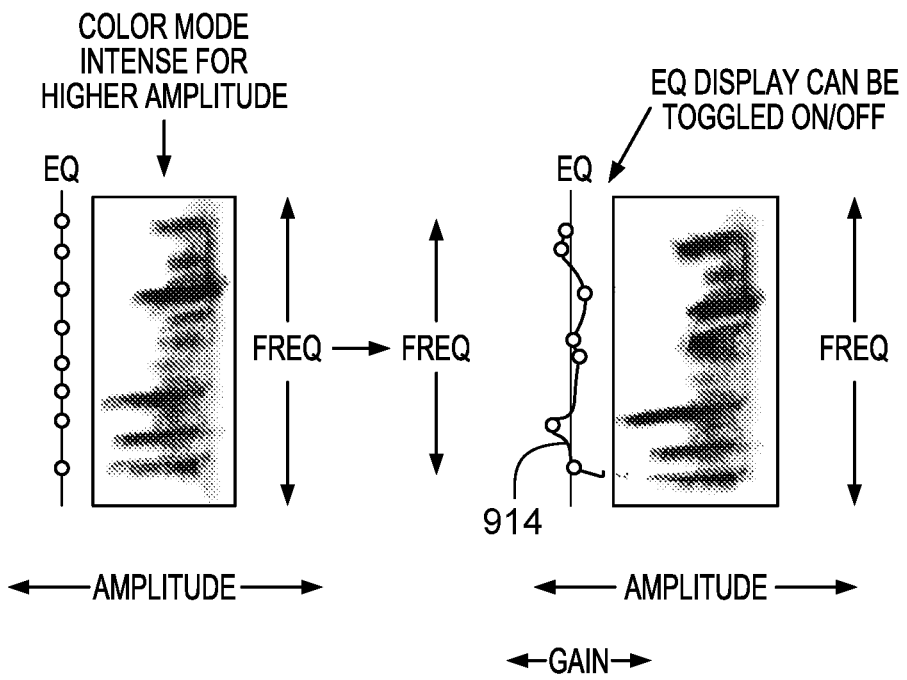

FIG. 9*b* illustrates an example of a visualization technique to display frequency and stereo information. In various embodiments, this visualization technique includes displaying shape and color in real time based on the frequency spectrum, amplitude, phase and/or stereo positioning of one or more sound sources. In the example illustrated (top diagram), frequency domain information for various tracks (represented by different colors) is plotted versus stereo field positions. In various embodiments, frequency information is derived by applying a fast Fourier transform (FFT) or discrete wavelet transform (DWT) to a time domain signal for each track of interest. In some embodiments, the FFT or DWT is performed by plug-in 112 of FIG. 1*a*, which measures time domain track data stored in DAW 104, performs the FFT or DWT, and sends frequency data to VR/AR headset 106 of FIG. 1*a* via hub 110 of FIG. 1*a*. It is possible to visually compare multiple sounds or tracks, understand how they are interacting with each other, and manipulate them.

In some embodiments, this visualization technique is applied to the virtual mix spheres of FIG. 9*a*, but it is not limited to virtual mix spheres. This visualization technique may also be used with various other virtual objects (e.g., virtual effects cubes) that are able to map virtual object movements to frequency spectrum, amplitude, phase and/or stereo positioning parameters. In some embodiments, moving a virtual mix sphere (or other virtual object) along the x-axis changes the stereo field composition for the track associated with the mix sphere, which can be reflected in real time in the visualization as changes along the x-dimension of the visualization. Volume changes for the track (e.g., by moving the virtual mix sphere or other virtual object along the y-axis) or digital signal processing proximity value (see FIG. 9*a*) changes (e.g., by moving the virtual mix sphere or other virtual object along the z-axis) can also be reflected in real time in the visualization (e.g., as changes along the z-dimension in the visualization). Other values/gain parameters may also be mapped to the z-dimension of the visualization. To reflect virtual mix sphere (or other virtual object) adjustments in the visualization in real time, DAW parameters associated with the virtual mix sphere (or other virtual object) are updated and reported to the DAW (e.g., see FIG. 10*b*), updated visualization data is generated based on the updated DAW parameters (e.g., by plug-in 112 of FIG. 1a), and the updated visualization data is sent for display (e.g., to VR/AR headset 106 of FIG. 1a via hub 110 of FIG. 1a).

In the example illustrated (see top diagram), frequency (from low frequencies to high frequencies, e.g., 100 hertz to 20 kilohertz using a logarithmic scale) is displayed on the y-axis and stereo field position (from left to right) is displayed on the x-axis. In the example shown, four tracks, each represented using a different color, are displayed. The frequency range for each track can be visualized by examining the y-axis. On the x-axis, each track's overall position in the stereo field can be visualized. For example, green track spectrum 912 is has frequency content from the lower frequencies to the higher frequencies (shown by the height of its visualization) and is panned to the right (shown by the left/right position of its visualization). Various other tracks, represented by different colors, are characterized by their own visualization heights and left/right positions. The z-axis (not shown explicitly in the top diagram) may also be used in the visualization. The distance that each frequency band protrudes toward the front (of the z-axis) can indicate the frequency band's amplitude (e.g., corresponding to volume). This is illustrated in the bottom diagram, which shows a side view of the top diagram so that the z-axis, representing amplitude, can be seen clearly (frequency is still the vertical y-axis). In the example illustrated, a front view (top diagram) and side view (bottom diagram) are included to illustrate the example clearly. In various embodiments, a single three-dimensional view is displayed to the operator/user for visualization purposes (e.g., see FIG. 9c). In some embodiments, the intensity of color is proportionate with amplitude. Stated alternatively, greater amplitude can be indicated by further protrusion towards the front and a more intense color. It is also possible to display and control a track's equalization curve, which can be a vertical line in front of the visualization.

The visualization is interactive and allows the operator/user to adjust an audio track's volume, stereo field placement, equalization curve, and so forth in three-dimensional space (e.g., see FIG. 9c) while viewing real-time analysis of those same parameters. By viewing this visualization for multiple tracks at a time, overlaid on top of each other, the operator/user can determine areas of frequency buildup, and thus make adjustments to compensate. In some embodiments, adjustment of these parameters is performed automatically based on the operator/user's determination of which tracks should be most prominent in the mix. For example, the operator/user can move the "Lead Vocal" track around in space and surrounding tracks' parameters are then automatically adjusted to make room for the "Lead Vocal" track. The operator/user can also apply "Mix Presets" that automatically build an entire mix, adjusting each individual element after analysis, based on stored sonic profiles of popular music genres. In various embodiments, optimization of the quality and quantity of audio data being sent for visualization is performed. Analysis of the audio passing through plug-in 112 of FIG. 1a can create an envelope profile for each track (e.g., attack, decay, sustain, and release, or ASDR). For example, an audio source with very short attack times (or fast transients), such as a cowbell, could be assigned a higher FFT sampling rate, so as to enable accurate representation in the visualization of those fast transients. An audio source with a slower attack time, such as a vocal, could be visualized reasonably accurately with a lower FFT sampling rate. Thus, the amount of data sent for visualization could be lower for the vocal and higher for the cowbell.

Figure 9C:
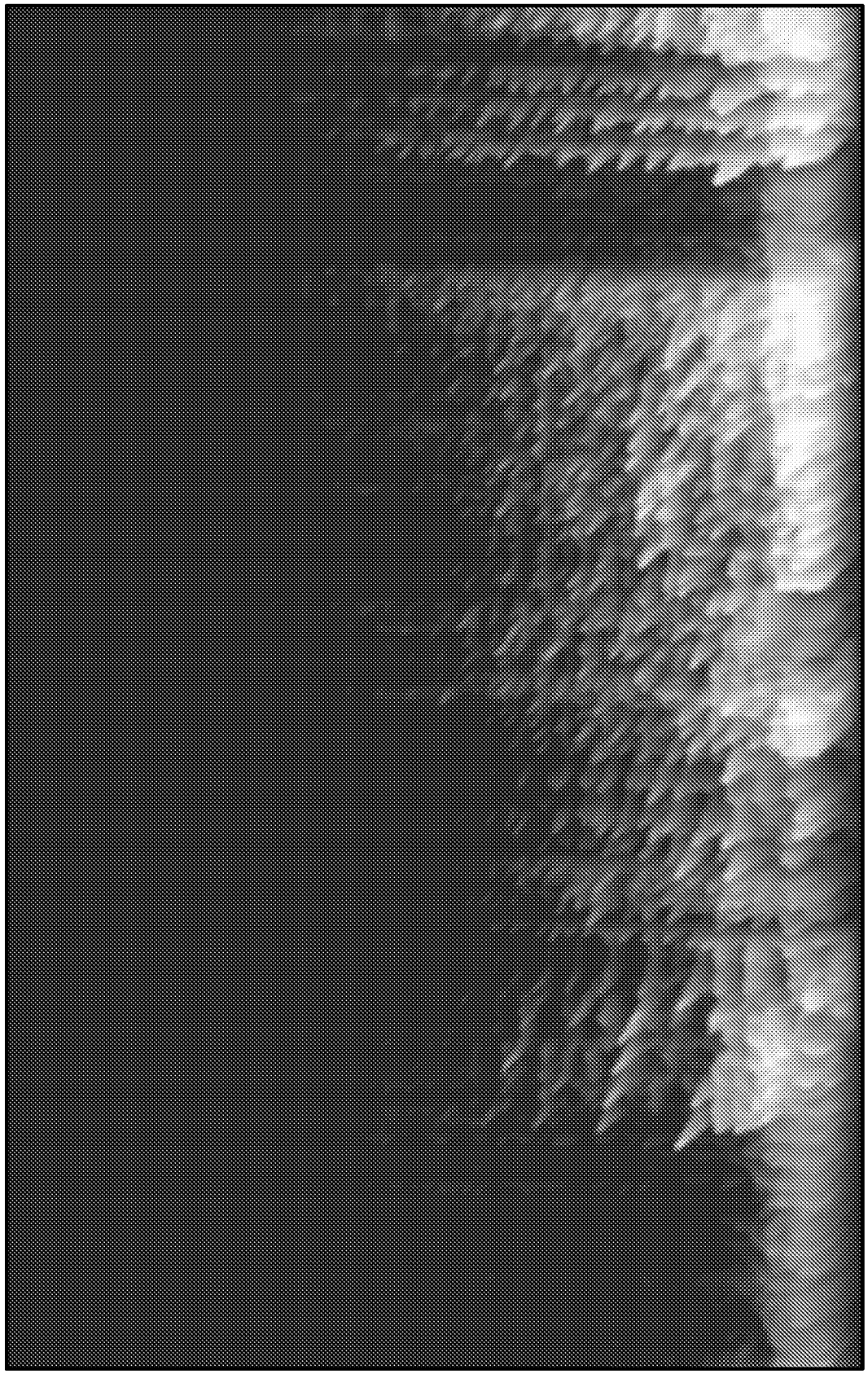
FIG. 9c is a screenshot illustrating an example visualization associated with the technique of FIG. 9b.

FIG. 9c is a screenshot illustrating an example visualization associated with the technique of FIG. 9b. In the example illustrated, a three-dimensional visualization is shown. In various embodiments, frequency range coverage, stereo field position, and amplitude of multiple audio sources (e.g., tracks) are visualized.

Figure 10A:
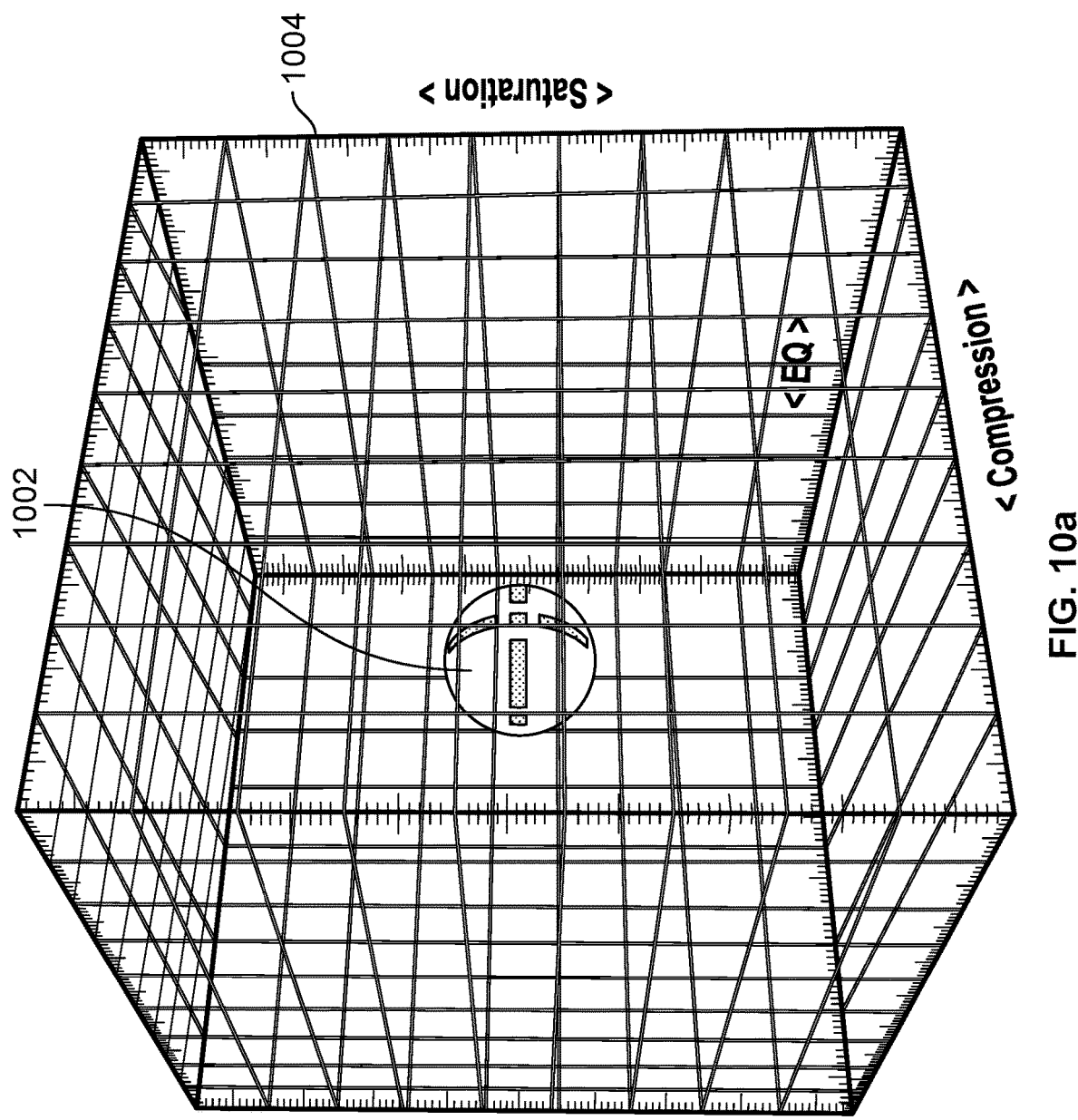
FIG. 10a is a screenshot illustrating an example of a virtual effects cube.

FIG. 10a is a screenshot illustrating an example of a virtual effects cube. In some embodiments, the virtual effects cube is generated by hub 110 and rendered by VR/AR headset 106 of FIG. 1a. The example shown includes control sphere 1002 and constraint cube 1004. Control sphere 1002 can be controlled by reaching into constraint cube 1004 and grabbing control sphere 1002. In various embodiments, control sphere 1002 can be resized and the virtual effects cube can be moved within the virtual/augmented reality environment to a location convenient for the operator/user. In various embodiments, an operator/user is allowed to manipulate multiple DAW parameters by adjusting control sphere 1002's position in space relative to constraint cube 1004 (e.g., control sphere 1002 cannot leave constraint cube 1004). For example, moving control sphere 1002 up and down can adjust volume (e.g., up corresponds to louder volume), moving control sphere 1002 left and right can control pan (where the sound appears in a stereo field, such as from left/right speakers), and bringing control sphere 1002 forward or backward can map to any other desired parameter (e.g., depth or how far away a sound appears to be) or signal processing algorithm (e.g., equalization, delay, reverb, etc.).

In some embodiments, rotation of control sphere 1002 is used to manipulate additional DAW parameters. In some embodiments, all DAW parameters associated with the virtual effects cube are communicated using OSC. Because the mapping of DAW parameters to control sphere 1002's movement (in three dimensions and rotation) is according to the operator/user's preference (e.g., using the example hub user interface of FIG. 1b), it is also possible that the various movement dimensions correspond to different audio input protocols (e.g., up/down movement mapping to a first DAW parameter communicated using OSC, left/right movement mapping to a second DAW parameter communicated using HUI, forward/backward movement mapping to a third DAW parameter communicated using MIDI, or any other combination of mappings).

Figure 10B:
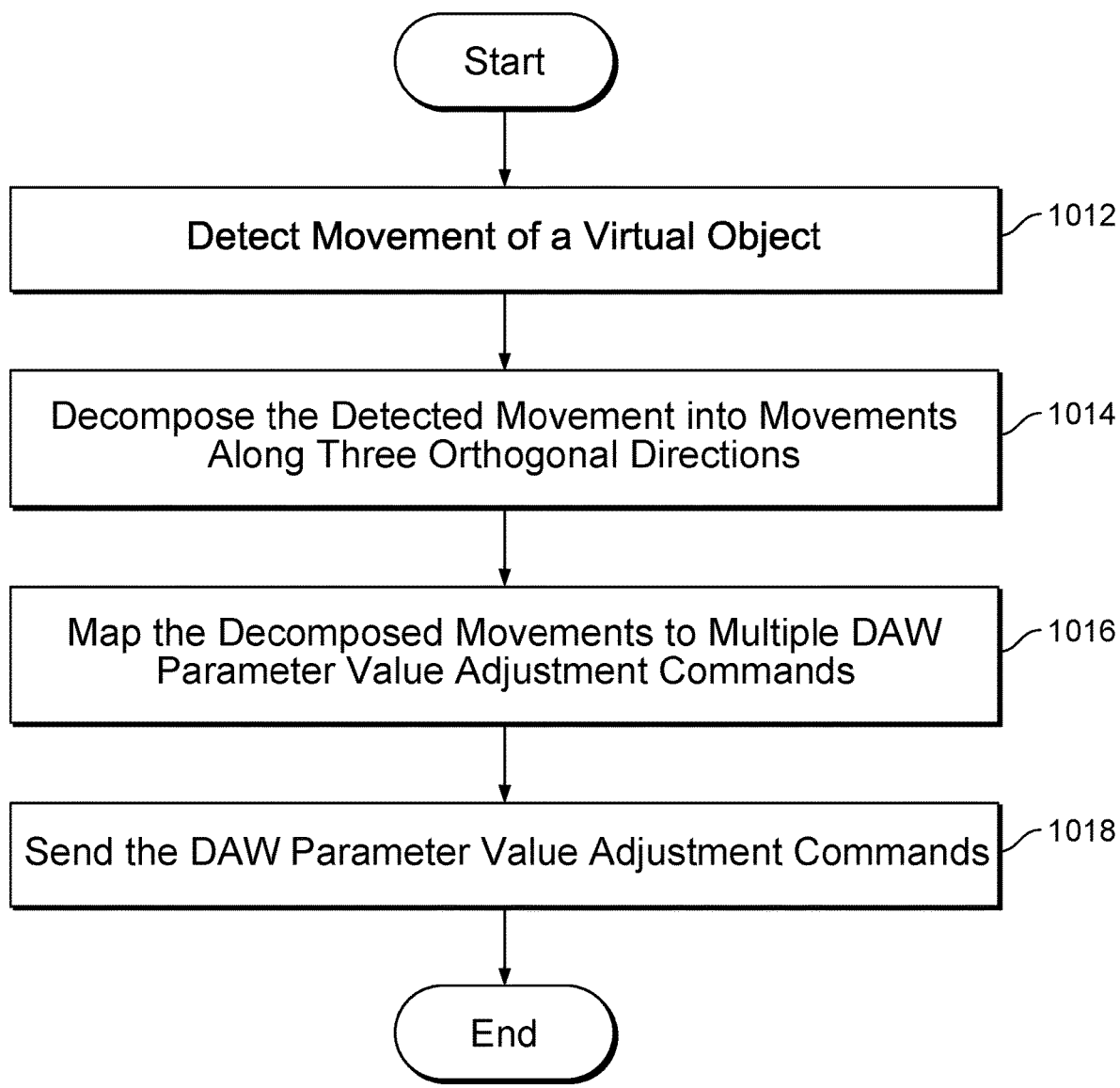
FIG. 10b is a flowchart illustrating an embodiment of a process for controlling three DAW parameters using one virtual object.

FIG. 10b is a flowchart illustrating an embodiment of a process for controlling three DAW parameters using one virtual object. In some embodiments, at least a portion of the process of FIG. 10b is performed in one or more steps of FIG. 3 or FIG. 4. In some embodiments, the process of FIG. 10b is a special case of the process of FIG. 3 or the process of FIG. 4. In some embodiments, the process of FIG. 10b is performed by display/control system 100 of FIG. 1a.

At 1012, movement of a virtual object is detected. In some embodiments, the virtual object is a virtual mix sphere. The virtual object can also be a virtual effects cube. Both types of virtual objects can be moved in three-dimensional virtual/augmented reality space. A virtual movement is detected when the virtual object's position changes. This can occur when a virtual hand coincides with the virtual object and makes a grabbing motion followed by a dragging motion. In some embodiments, control data associated with these motions are provided by gesture trackers 108 of FIG. 1a. In some embodiments, the movement of the virtual object is detected by control unit 102 of FIG. 1a. It is also possible for software within VR/AR headset 106 of FIG. 1a to detect the movement of the virtual object and communicate the detection to control unit 102.

At 1014, the detected movement is decomposed into movements along three orthogonal directions. In various embodiments, the three orthogonal directions form a three-axis coordinate system (e.g., XYZ axes) from the perspective of an operator/user. For example, with the operator/user facing the virtual object, from the operator/user's perspective, left/right corresponds to x-axis movement, up/down corresponds to y-axis movement, and toward/away from the operator/user corresponds to z-axis movement. In some embodiments, this decomposition is performed by control unit 102 of FIG. 1*a*. It is also possible for software within VR/AR headset 106 of FIG. 1*a* to perform this decomposition.

At 1016, the decomposed movements are mapped to multiple DAW parameter value adjustment commands. For example, in the XYZ coordinate system from the operator/user's perspective, the amount of x-axis movement corresponds to an amount to adjust a first DAW parameter, the amount of y-axis movement corresponds to an amount to adjust a second DAW parameter, and the amount of z-axis movement corresponds to an amount to adjust a third DAW parameter. Any of various DAW parameters can be mapped. Examples include volume, pan, equalization, delay, reverb, or any other DAW parameter. The DAW parameters mapped can be associated with different protocols typically used to transmit them (e.g., MIDI, HUI, and OSC). In some embodiments, software within VR/AR headset 106 of FIG. 1*a* generates the DAW parameter value adjustment commands and forwards the commands to hub 110 of FIG. 1*a*. It is also possible for the commands to originate in hub 110.

At 1018, the DAW parameter value adjustment commands are sent. In some embodiments, the DAW parameter value adjustment commands are communicated from VR/AR interface 116 of FIG. 1*a* to hub 110 of FIG. 1*a* to DAW 104 of FIG. 1*a* if the commands originate from VR/AR headset 106 of FIG. 1*a*. It is also possible for the commands to originate from control unit 102 of FIG. 1*a*. In various embodiments, hub 110 of FIG. 1*a* determines a protocol for communication of each command based on the type of command and how each specific DAW specifies how that command should be communicated (e.g., based on a DAW profile). Some command/DAW combinations allow for use of OSC, in which case hub 110 of FIG. 1*a* communicates with plug-in 112 of FIG. 1*a*. Other command/DAW combinations may require MIDI or HUI and communication with a specific interface within the host DAW. The process of FIG. 10*b* is an example of potentially three audio input protocols being used together to transmit DAW parameter values associated with a virtual object.

Figure 11A:
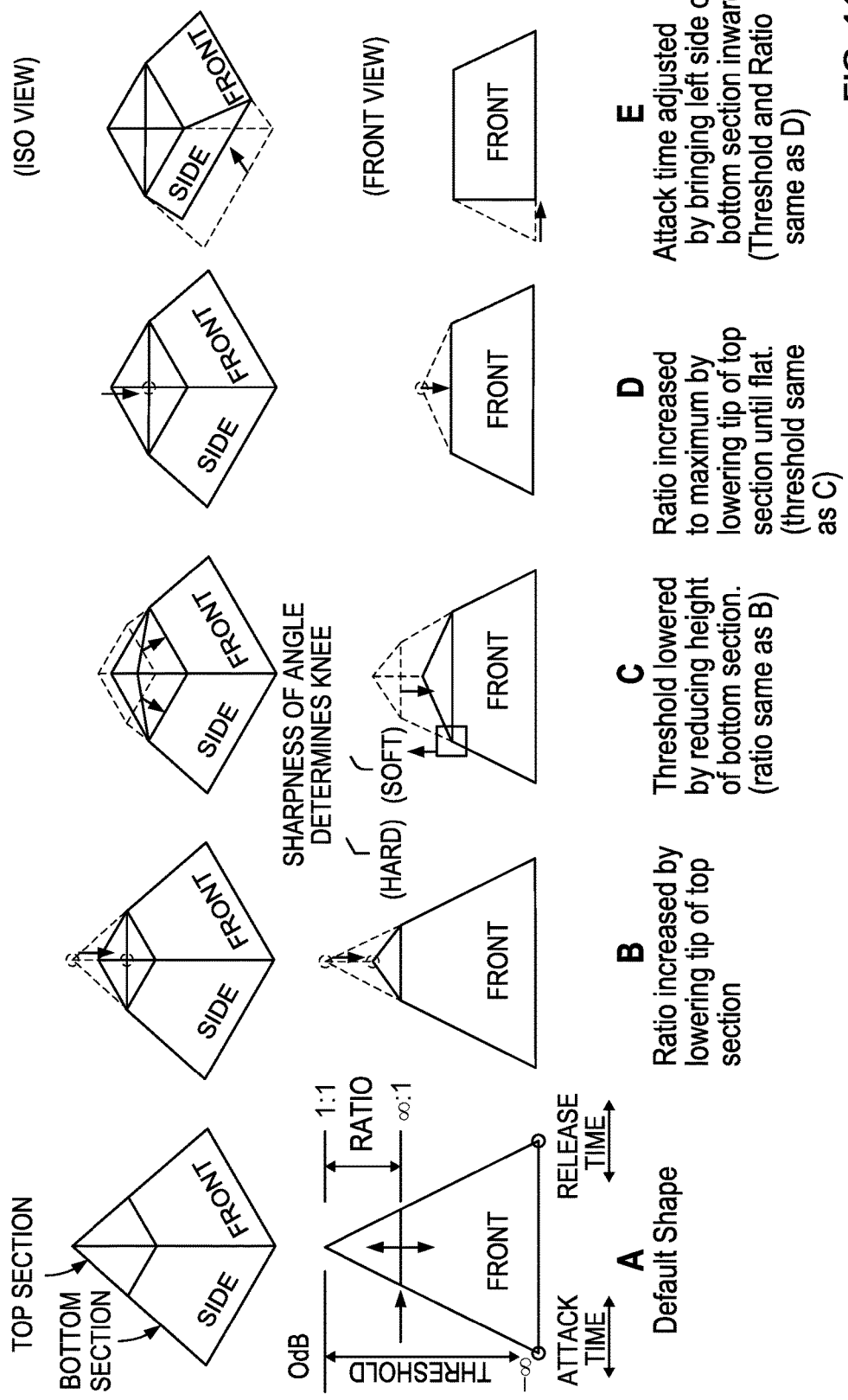
FIG. 11a is a diagram illustrating properties of virtual dynamics pyramids.

FIG. 11*a* is a diagram illustrating properties of virtual dynamics pyramids. Virtual dynamics pyramids are an example of how manipulating the shape of a three-dimensional object (an abstract object) can translate into useful control information. Dynamics pyramids can be used to shape sound dynamics (e.g., compression). Compression levels out the dynamic range of a piece of audio. For example, compression can be used to make loud sounds softer and soft sounds louder, which can be controlled by adjusting top and bottom sections of a virtual dynamics pyramid. Compression has benefits such as making vocals smoothers and drum sounds more cohesive. Virtual dynamics pyramid techniques can be applied to other parameters (e.g., synthesizer sound control, frequency shaping, or other audio processing parameters). In various embodiments, results of manipulations are shown and heard in real time, which provides the operator/user with visual and auditory cues and references to make control easier and more intuitive. In addition, as described in further detail below, haptic feedback can be included.

In some embodiments, virtual dynamics pyramids are generated by hub 110 and rendered by VR/AR headset 106 of FIG. 1*a*. In the example shown, diagrams A through E (each with isometric and front views) illustrate adjustment examples of pyramid shape affecting audio parameters. Diagram A illustrates a default pyramid shape including a top section and a bottom section. Diagram B illustrates how lowering the tip of the top section lowers the ratio of the height of the top section to the width of the top section. The tip can be lowered by grabbing the tip in virtual/augmented reality space and pulling down. The ratio of top section height to top section width is an example of a pyramid shape parameter that can be mapped to a DAW parameter. Diagram C illustrates lowering of the boundary line (threshold) between top and bottom sections of the pyramid. This is the equivalent of reducing the height of the bottom section. Where the boundary line is and the ratio of bottom section height to top section height are other examples of pyramid shape parameters that can be mapped to DAW parameters. Diagram D illustrates the case where the ratio of bottom section height to top section is maximized (when the top section's height is zero). Diagram E illustrates how attack time (side ramp steepness) of the bottom section can be adjusted by bringing a side inward. The side can be brought inward by grabbing a corner of the pyramid and dragging inward. Attack times of various sides of the pyramid are also pyramid shape parameters that can be mapped to DAW parameters. For example, compression of loud sounds can be mapped to the attack time of a first side of the pyramid and compression of soft sounds can be mapped to the attack time of a second side of the pyramid. It is also possible to manipulate other aspects of the shape of the pyramid to achieve this compression control.

Figure 11B:
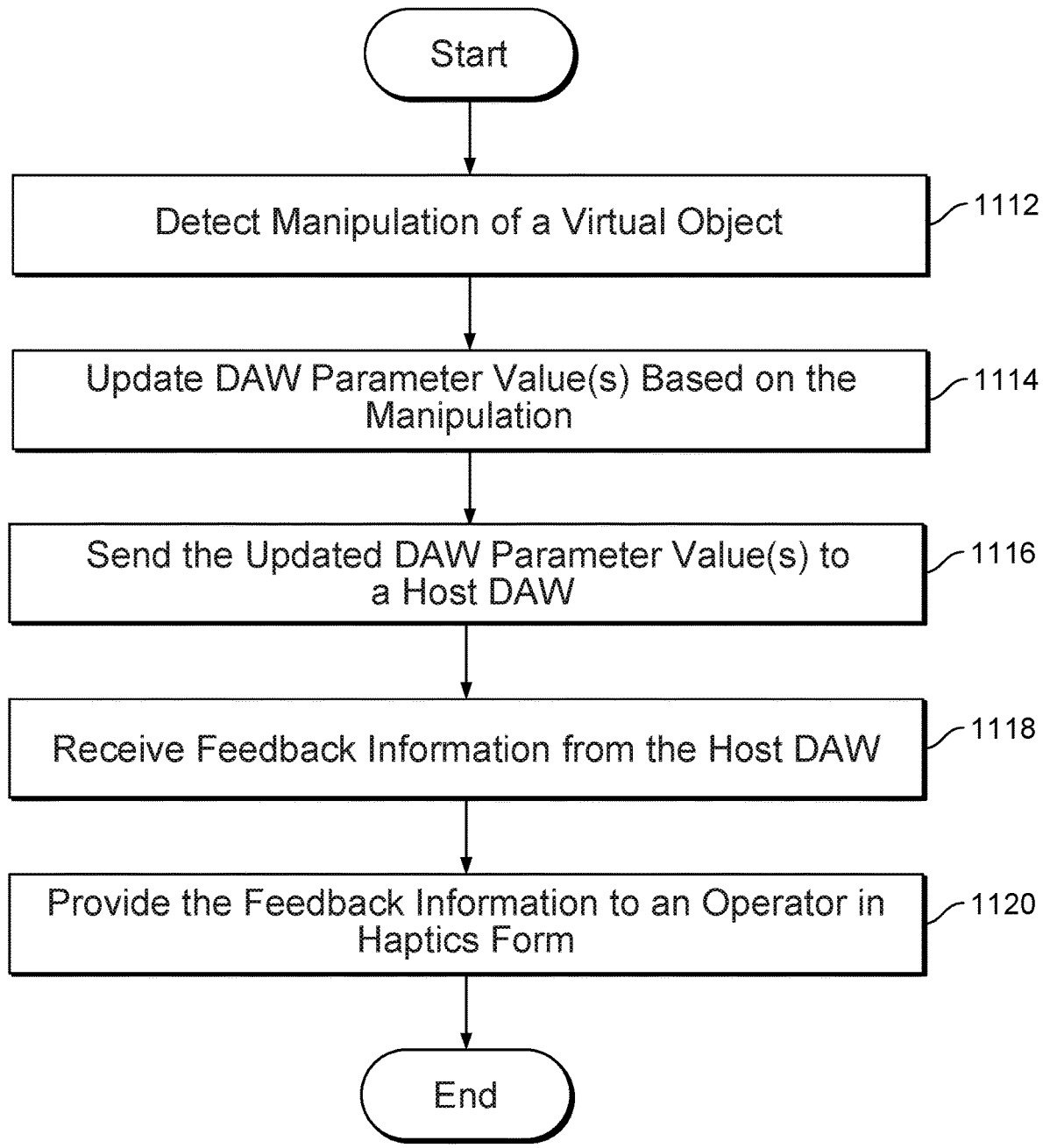
FIG. 11b is a flowchart illustrating an embodiment of a process for DAW parameter display and control that includes haptic feedback.

FIG. 11*b* is a flowchart illustrating an embodiment of a process for DAW parameter display and control that includes haptic feedback. In some embodiments, at least a portion of the process of FIG. 11*b* is performed in one or more steps of FIG. 3 or FIG. 4. In some embodiments, the process of FIG. 11*b* is a special case of the process of FIG. 3 or the process of FIG. 4. In some embodiments, the process of FIG. 11*b* is performed by display/control system 100 of FIG. 1*a*.

At 1112, a manipulation of a virtual object is detected. In some embodiments, the virtual object is a virtual dynamics pyramid. Examples of manipulations of the virtual dynamics pyramid include adjusting the height of a top section of the pyramid, adjusting the boundary line between the top section of the pyramid and a bottom section of the pyramid, adjusting the ratio of the bottom section height to the top section height, adjusting other ratios, and adjusting attack times of the bottom section. The manipulations can be detected based on detection of a virtual hand coinciding with various points of the pyramid in virtual/augmented reality space and making grabbing and dragging motions. In some embodiments, motion control data used to detect a manipulation is provided by gesture trackers 108 of FIG. 1*a*. In some embodiments, the manipulation is detected by control unit 102 of FIG. 1*a*. It is also possible for software within VR/AR headset 106 of FIG. 1*a* to detect the manipulation and communicate the detection to control unit 102.

At 1114, DAW parameter value(s) are updated based on the manipulation. For example, manipulating two attack times of a dynamics pyramid to adjust compression of loud and soft ranges of a piece of audio may correspond to updating two DAW parameter values. The DAW parameters can be associated with various protocols (e.g., MIDI, HUI, and OSC). In some embodiments, software within VR/AR headset 106 of FIG. 1*a* generates the DAW parameter value adjustment commands and forwards the commands to hub 110 of FIG. 1*a*. It is also possible for the commands to originate in hub 110.

At 1116, the updated DAW parameter value(s) are sent to a host DAW (the DAW being used) (e.g., by sending DAW parameter value adjustment commands) In some embodiments, the DAW parameter value adjustment commands are communicated from VR/AR interface 116 of FIG. 1*a* to hub 110 of FIG. 1*a* to DAW 104 of FIG. 1*a* if the commands originate from VR/AR headset 106 of FIG. 1*a*. It is also possible for the commands to originate from control unit 102 of FIG. 1*a*. In various embodiments, hub 110 of FIG. 1*a* determines a protocol for communication of each command based on the type of command and how each specific DAW specifies how that command should be communicated (e.g., based on a DAW profile). Some command/DAW combinations allow for use of OSC, in which case hub 110 of FIG. 1*a* communicates with plug-in 112 of FIG. 1*a*. Other command/DAW combinations may require MIDI or HUI and communication with a specific interface within the host DAW.

At 1118, feedback information is received from the host DAW. In various embodiments, hub 110 of FIG. 1*a* receives the feedback information. In some embodiments, the feedback information is based on the characteristics of the data of the piece of audio that is being processed (e.g., data associated with loud and soft sound ranges being compressed). This data affects the amount of haptic feedback that is ultimately provided. For example, if the piece of audio (being compressed) has a lot of data in the loud sound range versus the soft sound range, it may be desirable to provide more haptic feedback with respect to moving the dynamics pyramid corner (reducing the attack time) associated with the loud sound range. Stated alternatively, haptic feedback may correspond to the amount of processing that occurs (e.g., more haptic feedback where more compression occurs). The host DAW sends feedback information to hub 110 of FIG. 1*a* based on the effects of the manipulation of the virtual object.

At 1120, the feedback information is provided to an operator/user in haptics form. In some embodiments, the haptic feedback is provided by vibrating components (actuators) that are included with gesture trackers 108 of FIG. 1*a*. For example, gloves that include motion sensors can also include haptic feedback hardware. A benefit of haptic feedback (e.g., with respect to the audio compression example above) is that the operator/user can perceive whether more or less processing is being applied, which may be desirable if, for example, the operator/user wants to avoid over-processing of the piece of audio. A substantial amount of haptic feedback can indicate to the operator/user that too much processing is occurring, which can cue the operator/user to re-manipulate the virtual object to reduce the amount of processing.

Figure 12:
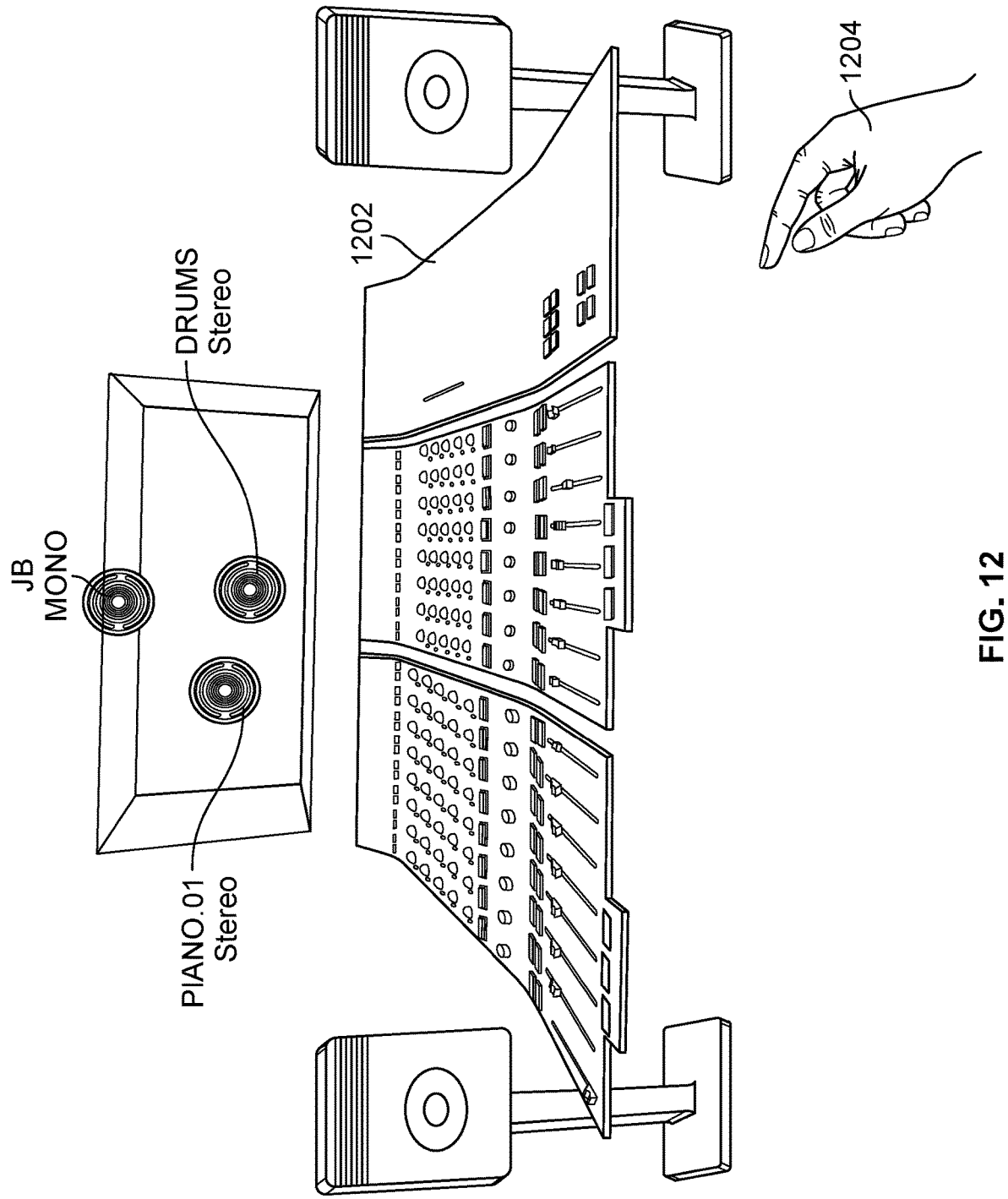
FIG. 12 is a screenshot illustrating an example of a virtual console.

FIG. 12 is a screenshot illustrating an example of a virtual console. In some embodiments, the virtual console is generated by hub 110 and rendered by VR/AR headset 106 of FIG. 1*a*. In the example illustrated, the virtual console includes virtual console station 1202, which can be manipulated with virtual hand 1204. In various embodiments, gesture trackers (e.g., gesture trackers 108 of FIG. 1*a*) are used to provide motion control data corresponding to grabbing and moving of components of virtual console station 1202. In various embodiments, the virtual console is a virtual representation of a traditional recording console and functions in a similar fashion to a traditional recording console in terms of controlling audio mixer functionality within a DAW. In some embodiments, the operator/user can toggle between traditional track control using the virtual console or an alternative (e.g., using virtual mix spheres). In various embodiments, the virtual console displays audio information from the DAW through level, phase, frequency, etc. metering.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    an interface configured to:
        receive motion control data from one or more sensors;
        receive a first parameter value associated with a music composition from a digital audio workstation; and
        receive a second parameter value associated with the music composition from the digital audio workstation; and
    a processor configured to:
        convert the motion control data to one or more manipulations of one or more virtual objects;
        map the one or more manipulations of the one or more virtual objects to at least a first command that adjusts the first parameter value and a second command that adjusts the second parameter value;
        send the first command to the digital audio workstation using a first audio input protocol recognized by the digital audio workstation; and
        send the second command to the digital audio workstation using a second audio input protocol recognized by the digital audio workstation.

2. The system of claim 1, wherein the one or more sensors include one or more gesture trackers attached to one or more human body parts.

3. The system of claim 1, wherein the first audio input protocol and the second audio input protocol are two of the following three protocols: Musical Instrument Digital Interface, Human User Interface Protocol, and Open Sound Control.

4. The system of claim 1, wherein the first parameter value, the second parameter value, or both the first parameter value and the second parameter value are associated with volume control.

5. The system of claim 1, wherein the first parameter value, the second parameter value, or both the first parameter value and the second parameter value are associated with sound recording or playback of the music composition.

6. The system of claim 1, wherein the first parameter value, the second parameter value, or both the first parameter value and the second parameter value are associated with audio dynamic range compression.

7. The system of claim 1, wherein the processor is configured to convert the motion control data including by being configured to convert real-world finger, hand, and arm movements to corresponding virtual finger, hand, and arm movements in a virtual space.

8. The system of claim 1, wherein the processor is configured to map the one or more manipulations of the one or more virtual objects including by being configured to map collisions with the one or more virtual objects to one or more Musical Instrument Digital Interface note parameter commands.

9. The system of claim 1, wherein the processor is configured to map the one or more manipulations of the one or more virtual objects including by being configured to map virtual button presses to one or more Human User Interface Protocol transport control commands.

10. The system of claim 1, wherein the processor is configured to map the one or more manipulations of the one or more virtual objects including by being configured to map movement of one of the virtual objects in three-dimensional virtual or augmented reality space to three separate commands adjusting three separate parameter values.

11. The system of claim 1, wherein the processor is configured to map the one or more manipulations of the one or more virtual objects including by being configured to map one or more shape changes of a virtual pyramid to one or more parameters associated with the virtual pyramid.

12. The system of claim 1, wherein the processor is configured to send the first command and send the second command including by being configured to send the first command, the second command, or both the first command and the second command wirelessly.

13. The system of claim 1, wherein the processor is configured to send the first command and send the second command including by being configured to send the first command, the second command, or both the first command and the second command to a plug-in embedded in the digital audio workstation.

14. The system of claim 1, wherein the processor is configured to send the first command and send the second command including by being configured to send the first command, the second command, or both the first command and the second command using Open Sound Control.

15. The system of claim 1, wherein the processor is configured to send the first command and send the second command including by being configured to perform at least one of the following data processing operations with respect to data associated with the first command, the second command, or both the first command and the second command: filter out repeat data, convert data to a lower volume format, or select a communication method based on data type.

16. The system of claim 1, wherein the interface is further configured to receive feedback information from the digital audio workstation associated with the first command, the second command, or both the first command and the second command.

17. The system of claim 1, wherein the processor is further configured to provide haptic feedback data to a haptic feedback device.

18. The system of claim 1, wherein the processor is further configured to send data associated with the one or more virtual objects to a headset display device.

19. The system of claim 1, wherein the interface is further configured to receive frequency domain data and stereo field position data associated with the music composition and the processor is further configured to send the frequency domain data and stereo field position data to a headset display device, wherein the stereo field position data is associated with the first parameter value or the second parameter value.

20. A method, comprising:
receiving motion control data from one or more sensors;
receiving a first parameter value associated with a music composition from a digital audio workstation;
receiving a second parameter value associated with the music composition from the digital audio workstation;
converting the motion control data to one or more manipulations of one or more virtual objects;
mapping the one or more manipulations of the one or more virtual objects to at least a first command that adjusts the first parameter value and a second command that adjusts the second parameter value;
sending the first command to the digital audio workstation using a first audio input protocol recognized by the digital audio workstation; and
sending the second command to the digital audio workstation using a second audio input protocol recognized by the digital audio workstation.

21. A system, comprising:
an interface configured to receive a parameter value associated with a music composition from a digital audio workstation and motion control data from a sensor; and
a processor configured to:
display a virtual object, wherein changes to the parameter value map to configuration changes of the virtual object;
determine an updated parameter value based at least in part on the motion control data;
display an updated virtual object; and
send the updated parameter value to the digital audio workstation.

22. The system of claim 21, wherein the virtual object is a virtual drum.

23. The system of claim 21, wherein the virtual object is a virtual fader or virtual slider that is larger in comparison with other virtual objects than a corresponding real-world fader or real-world slider is in comparison with other real-world objects.

24. The system of claim 21, wherein the virtual object is a virtual button hovering over a virtual arm.

25. The system of claim 21, wherein the virtual object includes at least one component that is grabbable and movable with a virtual hand.

26. The system of claim 21, wherein the virtual object is a virtual pyramid-shaped object.

* * * * *

UNITED STATES PATENT AND TRADEMARK OFFICE
CERTIFICATE OF CORRECTION

PATENT NO. : 10,643,592 B1
APPLICATION NO. : 16/667594
DATED : May 5, 2020
INVENTOR(S) : Gregory Stephen Barbone and Ryan Gilligan Page 1 of 1

It is certified that error appears in the above-identified patent and that said Letters Patent is hereby corrected as shown below:

In the Specification

In Column 23, Line(s) 10, after "commands)", insert --.--.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*